(12) United States Patent
Hempleman et al.

(10) Patent No.: US 7,814,133 B2
(45) Date of Patent: Oct. 12, 2010

(54) LIST BUILDING SYSTEM

(75) Inventors: James D. Hempleman, Chicago, IL (US); Sandra M. Hempleman, Chicago, IL (US); Neil A. Schneider, Lake Zurich, IL (US)

(73) Assignee: Premier International Associates, LLC, Chicago, IL (US)

( * ) Notice: Subject to any disclaimer, the term of this patent is extended or adjusted under 35 U.S.C. 154(b) by 0 days.

(21) Appl. No.: 11/932,604

(22) Filed: Oct. 31, 2007

(65) Prior Publication Data
US 2008/0104122 A1 May 1, 2008

Related U.S. Application Data

(63) Continuation of application No. 10/841,374, filed on May 7, 2004, now abandoned, which is a continuation of application No. 09/770,882, filed on Jan. 26, 2001, now Pat. No. 6,763,345, which is a continuation of application No. 08/859,995, filed on May 21, 1997, now Pat. No. 6,243,725.

(51) Int. Cl.
G06F 17/00 (2006.01)

(52) U.S. Cl. .............. 707/827; 707/607; 707/608; 707/609; 707/828

(58) Field of Classification Search .......... 707/600–834
See application file for complete search history.

(56) References Cited

U.S. PATENT DOCUMENTS

| | | |
|---|---|---|
| 3,291,919 A | 12/1966 | Robitaille |
| 3,990,710 A | 11/1976 | Hughes |
| 4,528,643 A | 7/1985 | Freeny |
| 4,647,989 A | 3/1987 | Geddes |
| 4,675,755 A | 6/1987 | Baumeister et al. |
| 4,703,465 A | 10/1987 | Parker |
| 4,725,977 A | 2/1988 | Izumi et al. |
| 4,744,281 A | 5/1988 | Isozaki |
| 4,766,581 A | 8/1988 | Korn et al. |

(Continued)

FOREIGN PATENT DOCUMENTS

JP H6-274157 9/1994

OTHER PUBLICATIONS

Apple Computer, Amended Answer in Civil Action No. 2-05CV-506.

(Continued)

*Primary Examiner*—Isaac M Woo
(74) *Attorney, Agent, or Firm*—Eugene M. Cummings, P.C.

(57) ABSTRACT

A system implementable using a programmable processor includes a plurality of pre-stored commands for building an inventory of audio, musical, works or audio/visual works, such as music videos. A plurality of works can be collected together in a list for purposes of establishing a play or a presentation sequence. The list can be visually displayed and edited. A plurality of lists can be stored for subsequent retrieval. A selected list can be retrieved and executed. Upon execution, the works of the list are presented sequentially either audibly or visually. The works can be read locally from a source, such as a CD, or can be obtained, via wireless transmission, from a remote inventory. If desired, establishment of a predetermined credit can be a pre-condition to being able to add items to the list for presentation.

7 Claims, 32 Drawing Sheets

U.S. PATENT DOCUMENTS

| | | | |
|---|---|---|---|
| 4,779,252 | A | 10/1988 | Custers et al. |
| 5,046,004 | A | 9/1991 | Tsumura et al. |
| 5,113,383 | A | 5/1992 | Amemiya et al. |
| 5,132,992 | A | 7/1992 | Yurt et al. |
| 5,157,643 | A | 10/1992 | Suzuki |
| 5,168,481 | A | 12/1992 | Culbertson et al. |
| 5,173,888 | A | 12/1992 | An |
| 5,173,900 | A | 12/1992 | Miller et al. |
| 5,181,107 | A | 1/1993 | Rhoades |
| 5,191,573 | A | 3/1993 | Hair |
| 5,197,047 | A | 3/1993 | Witheridge et al. |
| 5,262,940 | A | 11/1993 | Sussman |
| 5,288,982 | A | 2/1994 | Hosoya |
| 5,317,732 | A | 5/1994 | Gerlach et al. |
| 5,331,614 | A | 7/1994 | Ogawa et al. |
| 5,341,350 | A | 8/1994 | Frank et al. |
| 5,355,302 | A | 10/1994 | Martin et al. |
| 5,418,713 | A | 5/1995 | Allen |
| 5,428,732 | A | 6/1995 | Hancock et al. |
| 5,475,835 | A | 12/1995 | Hickey |
| 5,481,509 | A | 1/1996 | Knowles |
| 5,499,046 | A * | 3/1996 | Schiller et al. ............... 725/146 |
| 5,515,347 | A | 5/1996 | Mulder et al. |
| 5,541,638 | A | 7/1996 | Story |
| 5,550,575 | A | 8/1996 | West et al. |
| 5,557,541 | A | 9/1996 | Schulhof et al. |
| 5,561,604 | A | 10/1996 | Buckley et al. |
| 5,566,353 | A | 10/1996 | Cho et al. |
| 5,583,922 | A | 12/1996 | Davis et al. |
| 5,586,235 | A | 12/1996 | Kauffman |
| 5,594,601 | A | 1/1997 | Mimick et al. |
| 5,616,876 | A | 4/1997 | Cluts |
| 5,629,867 | A | 5/1997 | Goldman |
| 5,633,839 | A | 5/1997 | Alexander |
| 5,633,842 | A | 5/1997 | Nishida et al. |
| 5,644,764 | A | 7/1997 | Johnson et al. |
| 5,654,944 | A | 8/1997 | Lee et al. |
| 5,668,788 | A | 9/1997 | Allison |
| 5,670,730 | A | 9/1997 | Grewe et al. |
| 5,675,734 | A | 10/1997 | Hair |
| 5,683,253 | A | 11/1997 | Park et al. |
| 5,689,481 | A | 11/1997 | Tamura et al. |
| 5,691,964 | A | 11/1997 | Niederlein et al. |
| 5,691,972 | A | 11/1997 | Tsuga et al. |
| 5,726,909 | A | 3/1998 | Krikorian |
| 5,726,956 | A | 3/1998 | Kanno |
| 5,732,067 | A | 3/1998 | Aotake |
| 5,734,823 | A | 3/1998 | Saigh et al. |
| 5,740,134 | A | 4/1998 | Peterson |
| 5,751,672 | A | 5/1998 | Yankowski |
| 5,754,521 | A | 5/1998 | Yokota |
| 5,793,980 | A | 8/1998 | Glaser et al. |
| 5,794,249 | A | 8/1998 | Orsolini et al. |
| 5,796,945 | A * | 8/1998 | Tarabella .................... 709/219 |
| 5,798,924 | A | 8/1998 | Eufinger et al. |
| 5,801,694 | A | 9/1998 | Gershen |
| 5,809,246 | A | 9/1998 | Goldman |
| 5,819,160 | A | 10/1998 | Foladare |
| 5,822,284 | A | 10/1998 | Nishizawa |
| 5,860,068 | A | 1/1999 | Cook |
| 5,864,868 | A | 1/1999 | Contois |
| 5,867,457 | A | 2/1999 | Parvulescu et al. |
| 5,875,110 | A | 2/1999 | Jacobs |
| 5,890,152 | A | 3/1999 | Rapaport et al. |
| 5,892,915 | A | 4/1999 | Duso |
| 5,903,892 | A | 5/1999 | Hoffert et al. |
| 5,914,941 | A | 6/1999 | Janky |
| 5,918,213 | A | 6/1999 | Bernard et al. |
| 5,918,223 | A | 6/1999 | Blum et al. |
| 5,918,303 | A | 6/1999 | Yamaura et al. |
| 5,920,700 | A | 7/1999 | Gordon et al. |
| 5,926,624 | A | 7/1999 | Katz et al. |
| 5,949,411 | A | 9/1999 | Doerr et al. |
| 5,956,716 | A | 9/1999 | Kenner et al. |
| 5,963,957 | A | 10/1999 | Hoffberg |
| 5,969,283 | A | 10/1999 | Looney et al. |
| 5,974,503 | A | 10/1999 | Venkatesh et al. |
| 5,983,069 | A | 11/1999 | Cho et al. |
| 5,983,176 | A | 11/1999 | Hoffert et al. |
| 5,986,979 | A | 11/1999 | Bickford et al. |
| 6,011,760 | A | 1/2000 | Fleming, III |
| 6,011,761 | A | 1/2000 | Inoue |
| 6,047,292 | A | 4/2000 | Kelly et al. |
| 6,055,566 | A | 4/2000 | Kikinis |
| 6,058,428 | A | 5/2000 | Wang et al. |
| 6,062,868 | A | 5/2000 | Toriumi |
| 6,064,379 | A | 5/2000 | DeMoney |
| 6,065,042 | A | 5/2000 | Reimer et al. |
| 6,067,279 | A | 5/2000 | Fleming, III |
| 6,070,160 | A | 5/2000 | Geary |
| 6,118,450 | A | 9/2000 | Proehl et al. |
| 6,128,255 | A | 10/2000 | Yankowski |
| 6,226,672 | B1 | 5/2001 | DeMartin et al. |
| 6,243,725 | B1 | 6/2001 | Hempleman et al. |
| 6,360,368 | B1 | 3/2002 | Chawla |
| 6,437,229 | B1 | 8/2002 | Nobumoto |
| 6,446,080 | B1 | 9/2002 | Van Ryzin et al. |
| 6,587,403 | B1 | 7/2003 | Keller et al. |
| 7,047,241 | B1 | 5/2006 | Erickson |
| 7,143,102 | B2 | 11/2006 | Fiennes et al. |
| 2002/0010788 | A1 | 1/2002 | Nathan et al. |
| 2002/0016968 | A1 | 2/2002 | Nathan et al. |
| 2003/0014333 | A1 | 1/2003 | Brown |
| 2003/0065639 | A1 | 4/2003 | Fiennes et al. |
| 2004/0078761 | A1 | 4/2004 | Ohanian |

OTHER PUBLICATIONS

Premier International, Answer to Counterclaims in Civil Action No. 2-05CV-506.
Premier International, Motion to Strike in Civil Action No. 2-05CV-506.
Apple Computer, Opposition to Motion to Strike in Civil Action No. 2-05CV-506.
Premier International, Reply to Opposition to Motion to Strike in Civil Action No. 2-05CV-506.
Premier International, Opening Claim Construction Brief in Civil Action No. 2-05CV-506.
Apple Computer, Claim Construction Brief in Civil Action No. 2-05CV-506.
Premier International, Reply to Claim Construction Brief in Civil Action No. 2-05CV-506.
Judge Everinghman, Markman Order in Civil Action No. 2-05CV-506.
Court Transcript, Markman Hearing Minutes in Civil Action No. 2-05CV-506.
N/A, Docket Report for Civil Action No. 2-05CV-506.
Schneider, Deposition of Neil Schneider Transcript—Part 1, Jul. 11, 2007.
Schneider, Deposition of Neil Schneider Transcript—Part 2, Jul. 11, 2007.
Novacek, Deposition of Eugene Novacek Transcript, May 30, 2007.
Hempleman, Deposition of James Hempleman Transcript, Part 1, Jan. 25, 2007.
Hempleman, Deposition of James Hempleman Transcript, Index, Jan. 25, 2007.
Hempleman, Deposition of James Hempleman Transcript, Part 2, Jan. 26, 2007.
Hempleman, Deposition of Sandra Hempleman Transcript—Part 1, May 23, 2007.
Hempleman, Deposition of Sandra Hempleman Transcript—Part 2, May 23, 2007.
Hempleman, Deposition of Sandra Hempleman Transcript—Part 3, May 23, 2007.

Hempleman, Deposition of Sandra Hempleman, Index, May 23, 2007.
Unknown, Music Databases, Unknown publication date, MP3 Developments.
Ampex; Section 2; Joystick Operation.
RCS Works; Cart Wall; User's Guide and Reference Manual; (Feb. 1994); RCS, Scarsdale, NY by Richard Byrne and Karen Murphy.
VR300 TM Video Server User Manual Version 1.0, Mar. 20, 1998.
ASC Audio Video Corporation; Burbank, CA; Broadcast Tools: SpotBase, Playlist & TapeBase.
ASC Audio Video Corporation; Virtual Recorder, Revision: Sep. 9, 1996 Basic Operations, Chaper 1.
Studio Recorders and Players with DT; BVW-75.
Sony broadcast; BVH-2500/2500P; 1 inch Delta Time Recorder, SMPTE/EBU Type C Format.
Sony BE-2000 System Information Manual.
Sadie Master System Specification Sheet.
Tektronix User Manual Profile Family; Tektronix, Inc., Wilsonville, OR; http://www.tek.com; Copyright 1997 Tektronix, Inc.
CompuSonics Video; Application Notes; Copyright 1986 CompuSonics Video Corp.
Postcard mailed in Sep. 1986 (handwritten) of CompuSonics Dsp 1000.
CompuSonics 1988 Product Line; CompuSonics Corporation, Palo Alto, CA; Copyright 1988.
CompuSonics Application Notes; Copyright 1986.
Google search for CompuSonics; Dated Apr. 1, 2004.
Unknown—Article—Last June, we invited you to record digitally on the world's first home audio computer.
Transmittal Form U.S. Appl. No. 09/770,882, filed Aug. 5, 2005.
Notice of Acceptance of Power of Attorney mailed Oct. 21, 2005.
Transmittal Form U.S. Appl. No. 09/770,882, filed Sep. 17, 2007.
Information Disclosure Statement by Applicant for U.S. Appl. No. 09/770,882.
Certificate of Correction for 6,243,725 Sep. 17, 2002.
Transmittal of Utility Patent Application for Filing; May 21, 1997; List Building System.
Patent Application Fee Determination Record; U.S. Appl. No. 08/859,995; Effective Oct. 1, 1997.
Multiple Dependent Claim Fee Calculation Sheet; U.S. Appl. No. 08/859,995.
Notice to File Missing Parts of Application; Oct. 14, 1997; U.S. Appl. No. 08/859,995.
Notice to File Missing Parts of Application; Nov. 10, 1997; U.S. Appl. No. 08/859,995.
Information Disclosure Statement filed May 21, 1997 for "List Building System"; U.S. Appl. No. 08/859,995.
Prior patent art filed May 21, 1997 for U.S. Appl. No. 08/859,995.
CD/Spectrum Pro 3.2: CD-Audio Player with Graphical Spectrum Analyzer; Jun. 19, 1997.
A collection of descriptions on computer audio players.
"Download favorite music from Web into computer" from Daily Herald on Monday, Dec. 1, 1997.
Plugged in Aug. 3, 1997; "World Wide Wurlitzer"; Recorded music coming to the Web, but it'll cost more than 3 plays for a quarter.
4 pages of descriptions of US patents.
Office Action Summary for U.S. Appl. No. 08/859,995 in response to communications filed on May 21, 1997.
Certificate of mailing on Oct. 19, 1998 for U.S. Appl. No. 08/859,995; Response Transmittal Letter.
Certificate of Mailing on May 21, 1997 for U.S. Appl. No. 08/859,995; Petition for Extension of Time.
Schwartz, David, AES 76th Convention, NYC; Specifications and implementation of a Computer Audio Console for Digital Mixing and Recording, Oct. 8-11, 1984; 10 pages.
"News" article about CompuSonics DSTS (digital audio transmission system).
Photocopy of the back of a machine (1 page).
Photocopy of "Conventional Audio Software Production/Distribution" diagram; 1 page.
"Liquid Audio Strikes Key Partnerships, Technology Deals to Deliver a Sound and Marketable Internet Solution", Multimedia Week, Sep. 2, 1996.

"Defendant Apple Computer, Inc.'s Preliminary Invalidity Contentions," Civil Action No. 05-CV-506 *Premier International Associates, LLC* v. *Apple Computer Co.*, Aug. 21, 2006.
Judge Everingman, Markman Order in Civil Action No. 2-05CV-506.
"Deposition of David M Schwartz"; Feb. 1, 2001.
Premier v. HP—Acer Answer.
Audio Times; The Industry's Only Newspaper; vol. 26, No. 5, May 1984; Summer CES Preview; Digital Recording System Uses Floppy Discs.
Towards the Digital Music Library: Tune Retrieval from Acoustic Input; by McNab, Smith, Witten, Henderson and Cunningham; Department of Computer Science, School of Education, University of Waikato, Hamilton, New Zealand, Copyright 1996 ACM.
*Premier International Associates* v. *Apple Computer*, Civil Action No. 2:05-CV--506 (TJW); US District Court Eastern District of Texas, Marshall Division; Order of Dismissal; Sep. 18, 2007.
*Premier International Associates* v. *Microsoft Corp. et al.*, Civil No. 2-07CV-396; US District Court Eastern District of Texas, Marshall Division; Complaint for Patent Infringement; Sep. 11, 2007.
*Premier International Associates* v. *Hewlett-Packard Co. et al.*, Civil No. 2-07CV-395; US District Court Eastern District of Texas, Marshall Division; Complaint for Patent Infringement; Sep. 11, 2007.
Complaints for (1) *Premier* v. *Apple*, (2) *Premier V. Hp*, and (3) *Premier* v. *Microsoft*.
Claim construction for *Premier* v. *Apple*, Civil Action 2:05-CV-506-TJW.
Complaint for Patent Infringement; *Premier* v. *Microsoft*; Civil No. 2-07CV-395.
Complaint for Patent Infringement; *Premier* v. *HP*; Civil No. 2-07CV-396.
Plaintiff Premier International's Opening Brief Regarding Claim Construction; No. 2-05CV-506 TJW.
Jakob Nielson, Comparative Design Review: an Exercise in Parallel Design, Apr. 24-29 ("Nielson Article").
Response to Office Action dated Nov. 2, 2007 in the '201 Reexamination Proceeding.
Paul Resnick and Hal R. Varian, "Recommender Systems" Mar. 1997/vol. 40 No. 3 Communications of the ACM.
Architecting Personalized Delivery of Multimedia Information, Shoshana Loeb, Communications of the ACM/Dec. 1992/vol. 35, No. 12.
DSP-1000 Audio Owners Guide; Compusionics Corporation 1986.
Aug. 1984; The Recording Industry Magazine Mix; Compusonics: Another Digital Audio Standard; Neil Weinstock.
Consumer Electronics, Jun. '84, vol. 12, Watch out digital discs: Here comes floppy audio.
1984 Time Inc., Fortune, Nov. 12, 1984; The Search for the Digital Recorder, Brian Dumaine.
A high speed telecommunications Interface for digital audio transmission and reception by Hyun Heinz Sohn; presented at the 76th convention 1984 8-11 New York AES.
Liquid Audio Strikes Key Partnerships, technology deals to deliver asound and marketable Internet solution multimedia week Sep. 2, 1996.
Article believed to have been published Aug. 3, 1997 entitled "World Wide Wurlitzer.".
CompuSonics DSP-1000/PC (1 page).
"Content-Based Classification, Search and Retrieval of Audio, "World et al. IEEE 1070-986X/96, IEEE 1996.
Four (4) pages of a Dialog printout featuring items 7 and 8 from file 275; dated 1984.
Independent Consultant Agreement between Well, Gotshal & Mangers, and RealNetworks, Inc.; Executed by Jessica L. Bagner, Esq. and David Schwartz on Mar. 25, 2004 (3 pages).
Listing dated Oct. 13, 1996 describing EagCD, an audio CD playing utility.
Listing dated Dec. 20, 1994, describing "WINDISC," an audio CD player.
M2 Presswire. "Liquid Audio-Liquid AUdio Debuts Premier Music on Demand Solution for the Internet." Copyright 1996 MS Communications Ltd.; Nov. 4, 1996 (2 pages).

Pfeiffer, "Automatic Audio Content Analysis," pp. 21-30, Association of Computing Machinery, 1996.
Printout dated Dec. 31, 1996 which described "CD-REC" for recording off of an audio-CD.
Alpha Books: The Complete Idiot's Guide to Windows 95 Second Edition by Paul McFedries; Copyright 1997.
Microsoft: The Complete Idiot's Guide to Windows 95 by Paul McFedries with Faithe Wempen; Copyright 1995.
Selector Manual: Radio Computing Services, Inc. Scarsdale, New York; Copyright 1979.
Selector the Music System Manual Jan. 1991 (Selector Manual).
Enco Systems, DAD486x Digital Audio Delivery System Brochure, 1995.
Enco Systems, DAD486x Digital Audio Delivery System Operation Manual; Verion 6.0A.
Master Control Manual; The Paperless and Cartless Studio System; Version 3.03.
Premier v. Apple-Case No. 2:05-cv-00506-TJW; Apple Computer, Inc.'s Amended Answer, Affirmative Defenses and Counterclaims to Premier International Associates, LLC's First Amended Complaint for Patent Infringement: filed Feb. 16, 2007.
Premier v. Apple-Case No. 2:050cv-00506-TJW; Plaintiffs Answer to Defendant's Amended Counterclaims; filed Mar. 8, 2007.
Premier v. Apple-Case No. 2:05-cv-00506-TJW; Plaintiff Premier's Motion to Strike Allegations of Apple's Amended Answer, Affirmative Defenses and Counterclaims; filed Mar. 8, 2007.
Premier v. Apple-Case No. 2:05-cv-00506-TJW; Premier's Reply to Apple's Opposition to Plaintiff's Motion to Strike Allegations of Apple's Amended Answer, Affirmative Defenses and Counterclaims; filed Apr. 4, 2007.
Premier v. Apple-Case No. 2:05-cv-00506-TJW; Plaintiff Premier International's Opening Brief Regarding Claim Construction; filed Apr. 16, 2007.
Premier v. Apple-Case No. 2:05-cv-00506-TJW; Plaintiff Premier International's Reply Brief to Defendant Apple Computer's Claim Construction Brief; filed May 7, 2007.
Premier v. Apple-Case No. 2:05-cv-00506-TJW; Markman Hearing Minutes of May 17, 2007.
Premier v. Apple-Case No. 2:05-cv-00506-TJW; U.S. District Court Docket Report; Jan. 4, 2008.
Premier v. Apple-Case No. 2:05-cv-00506-TJW; Apple Computer, Inc.'s Opposition to Premier's Motion to Strike Allegations of Apple's Amended Answer, Affirmative Defenses and Counterclaims: filed Mar. 26, 2007.
Premier v. Apple-Case No. 2:05-cv-00506-TJW; Apple Computer, Inc.'s Claim Construction Brief, filed Apr. 30, 2007.
Premier v. Apple-Case No. 2:05-cv-00506-TJW; Memorandum Opinion and Order; filed May 23, 2007.
Prosecution History for U.S. Pat. No. 6,763,345, Jul. 13, 2004.
100 Million iPods Sold; 2007.
Apple Reports First Quarter Results; Jan. 17, 2007.
The DAD486x Digital Audio Delivery System Operation Manual Version 6.0A RevA Jun. 30, 1995.
Apple Announces iTUnes 3, Jul. 17, 2002.
Apple-iPod Technical Specifications.
iTunes keeps track of your tastes; 2002.
Webster's New World Dictionary, 1988.
The Authoritative Dictionary of IEEE Standards Terms, 2000.
Webster's Third New International Dictionary, 2002.
Office Action for U.S. Appl. No. 09/770,882 mailed Dec. 18, 2002.
Petition for Extension of Time Under 37 CFR 1.136(a) for U.S. Appl. No. 09/770,882 received Feb. 14, 2003.
Office Action for U.S. Appl. No. 09/770,882 mailed May 7, 2003.
Applicant Transmittal Letter U.S. Appl. No. 09/770,882 received Aug. 11, 2003.
Office Action for U.S. Appl. No. 09/770,882 mailed Nov. 4, 2003.
Interview Summary for "List Building System" U.S. Appl. No. 09/770,882 received Feb. 9, 2004.
Amendment E for "List Building System" U.S. Appl. No. 09/770,882 received Feb. 9, 2004.
Notice of Allowance and Fee(s) Due mailed Mar. 9, 2004 for 09/770,882.
Office Action for 09/770,882 mailed Mar. 15, 2004.
Transmittal Form, 09/770,882, May 5, 2005.
Securities and Exchange Commission; Form 8 Amendment to Application of Reoprt dated Aug. 31, 1988 and received Sep. 12, 1988 for CompuSonics Corporation.
Securities and Exchange Commission; Form 10K Annual Report Pursuant to Section 13 or 15(d) of the Securities Exchange Act of 1934 for CompuSonics Corporation received Jun. 13,1988.
Securities and Exchange Commission; Form 10K Annual Report Pursuant to Section 13 or 15(d) of the Securities Exchange Act of 1934 for CompuSonics Corporation received Jun. 15,1987.
Securities and Exchange Commission; Form 10K Annual Report Pursuant to Section 13 or 15(d) of the Securities Exchange Act of 1934 for CompuSonics Corporation received Jun. 13,1986.
University of California, Berkeley; May 1984; Appendix A: Command Descriptions.
Unknown-Article on CompuSoncs Corporation.
CompuSonics DSP-1000 Digital Disk Recorder/Player Specification Sheet; Copyright 1984.
CompuSonics PC/Sonics Remote control and Relational Database Software Specification Sheet; Copyright 1987.
CompuSonics DSP 1500 Digital AUdio Cart Recorder Specification Sheet.
CompuSonics DSP 1000 AUdio Computer Specification Sheet; Copyright 1987.
Digilist: Where Real Estate Brokerage Leaps from an Ancient Art to the State of the Art; Digital Marketing Corporation; World Developers of V.M.L.S. Technology, W. Bloomfield, Michigan 48322.
A High Speed Telecommunications Interface for Digital Audio Transmission and Reception by Hyun Heinz Sohn, Shugart Corporation for CompuSonics Corporation.
PC World, Apr. 1985; Article-Hi-Fi Floppy.
TD-Tape Deck; Hampton's 1985; TD Interview by Chris Vollor, David Schwartz, President of CompuSonics-Article-Promises to Keep; Tape Deck 1985.
AES 76th Convention, NYC; Title: Strategies for the Representation and Data Reduction of Digital Music Signals by John P. Stautner, CompuSonics Corp., Cambridge, MA; Jun. 20, 1984.
CompuSonics, Denver, CO; Jul. 16, 1984; Letter to Shareholders from David M. Schwartz, President.
CompuSound, Inc. Apr. 6, 1984; Letter to Shareholders from David M. Schwartz, President; Circle Reader Service #19.
CompuSonics, Englewood, CO; Oct. 10, 1985; Letter to Shareholders from David M. Schwartz, President.
CompuSound, Inc. Denver, CO; Jan. 6, 1984; Letter to Shareholders from David M. Schwartz, President.
AES; Digital Audio Recording on Floppy Disk Presented at the 78th Convention 1985 May 3-6, Anaheim, CA; by David M. Schwartz and John P. Stautner, CompuSonics Corporation, Denver, CO.
CompuSonics-Articles.
hfd The Weekly Home Furnishings Newspaper-Article-CompuSonics readies floppy disk to record and play back music.
Monday, Jun. 4, 1984 CES Trade News Daily; vol. 26, Issue Three; CompuSonics Fuses Computer, Audio Into "World's First" Home Digital Recorder.
International Audio Video; Manufacturing update; Jun. 1984.
CompuSonics, Denver, CO; May 31, 1985; Letter to Shareholder from David M. Schwartz, President.
CompuSonics, Denver, CO; Jul. 16, 1984; Letter to Shareholder from David M. Schwartz, President.
CompuSound, Inc., Denver, CO; Apr. 6, 1984; Letter to Shareholder from David M. Schwartz, President.
CompuSound, Inc., Englewood, CO; Jan. 6, 1984; Letter to Shareholder from David M. Schwartz, President.
Consumer Electronics Daily, vol. VIII No. 5 Issue 8, May 10, 1984; Article CompuSonics to Bow Digital Audio Floppy Disk Player/Recorder.
Independent Consultant Agreement, Mar. 25, 2004 between Microsoft and RealNetworks.
Audio; Musical Floppies; "CompuSonics DSP-1000 could revolutionize home recording, and the "biggies" are lining up for a piece of the pie" by Keith Yates.

Washington University Public Domain Archives, Washington University, Office of the Network Coordinator, St. Louis, MO; email: archives@wugate.wustl.edu; Jun. 21, 1989 NNSC Section 3.10.
Network Access; Email: thor@thor.ucar.edu; to access archive server: Send email to netlib@thor.ucar.edu; Who Can Use the Archive; Jun. 21, 1989 NNSC Section 3.9.
Periodical, Microcomputers for information management, by Chingchih Chen, Dec. 87, vol. 4, No. 4; Meriam Library—CSU Chicago; An International Journal for Library and Information Services.
Digital Video Interactive-A New Integrated Format for Multi-Media Information by Sandra Morris, David Sarnoff Research Center, Princeton, NJ; Microcomputer for Information Management 4(4); Dec. 1987.
Patricia Seybold's, vol. 11, No. 4, Apr. 1988; Office Computing Report, Products-Trends-Issues-Analysis; PC Lans Revisited-Coming of Age by Judith R. Davis; Copyright 1988 by Patricia Seybold's Office Computing Group.
Securities and Exchange Commission, Washington, DC; Form 10-K, Annual Report Pursuant to Section 13 or 15 of the Securities Exchange Act for Compusonics Corporation for fiscal year ended Feb. 28, 1985; SEC Receive Date May 29, 1985.
Patricia Seybold's Office Computing Report, vol. 11, No. 4; CD-ROM Listen to the Music by David S. Marshak.
IEEE/IEICE, Global Telecommunication Conference 1987, GLOBECOM '87 Tokyo Conference Proceedings, Edited by Noriyoshi Kuroyanagi; vol. 3 of 3.
GLOBECOM '87, News and Movies in the 50 Megabit Living Room by Andrew Lippman and Walter Bender, MIT Media Laboratory; Copyright 1987 IEEE.
Liquid Audio White Paper; Buying Music Over the Internet by Ruth Columbo; Copyright 1997 by Liquid Audio, Inc.; http://www.liquidaudio.com.
M2 Presswire; Nov. 4, 1996; Headline: Liquid Audio—Liquid Audio debuts premier music on demand solution for the Internet; Copyright 1996 M2 Communication Ltd.
The New York Times; Aug. 12, 1996, Monday, Late Edition-Final; Headline: Technology: Digital Commerce—New ways of sending radio over the Net promise more sound and less static; Copyright 1996 the New York Times Company.
Los Angeles Times; Nov. 25, 1996, Monday, Home Edition; Headline: Heard on the Beat—Sound of CD-Quality Music Flowing on Web; Copyright 1996 The Times Mirror Company; Los Angeles Times.
Billboard; Nov. 16, 1996; Headline: Enteractive Briefs: Near-CD-Quality Music Flowing From Internet; Copyright 1996 Billboard Publications, Inc.
Orlando Sentinel (Florida); Mar. 1, 1997 Saturday, METRO; Headline: Cyberscene; Copyright 1997 Sentinel Communications Co.
Business Wire; Apr. 7, 1997, Monday; Headline: Liquid Audio Brings Dolby Digital Internet Audio to Macintosh Computers; Copyright 1997 Business Wire, Inc.
Internet World; Mar. 24, 1997; Headline: Liquid Audio Delivers Dolby Digital Music via Web; Copyright 1997 Mecklermedia Corporation.
Secured-Article.
Brook Harris Nov. 83; Off-Line/On-Line Video Editing Considerations of Cost Effective Video Post Production.
CMX Corporation; CMS 3400 Operations Manual; First Edition, Aug. 1984; Revision A, Jan. 2, 1985; Copyright 1985 by CMX Corporation, Santa Clara, CA.
CartWorks Spot Set Editor User's Manual; Produced by: dbm Systems, Inc., Ridgeland, MS.
CartWorks Script Editor User's Manual v3.12; Produced by: dbm Sytems, Inc. Ridgeland, MS.
CartWorks On-Demand Editor User's Manual; Produced by: dbm Systems, Inc., Ridgeland, MS.
CartWorks MHD "Music-On-Hard-Drive" QuickSchedule User's Manual, Revised on: Feb. 28, 1998; Produced by: dbm Systems, Inc., Ridgeland, MS; http://www.cartworks.com.
CartWorks MHD "Music-On-Hard-Drive" User's Manual V6.8; Produced by: dbm Systems, Inc., Ridgeland, MS; http://www.cartworks.com.
CartWorks File Utilities User's Manual; Produced by: dbm Systems, Inc., Ridgeland, MS; Contents.
CartWorks Version 5.xx; System Installation Guide; Produced by: dbm Systems, Inc., Ridgeland, MS; http://www.cartworks.com; Contents.
Broadcast Engineering Apr. 1994; Field Report; Louth Automation; ADC-100 by Keith Aotaki.
MS Presswire Nov. 4, 1996 Liquid Audio; Liquid Audio debuts premier music on demand solution for the internet.
New York Times Jul. 4, 1993; A New Music Retailing Technology Says, 'Listen Here'; by Matt Rothman.
Interchi '93, Apr. 24-29, 1993; Comparative Design Review: An Exercise in Parallel Design.
Index to File History of U.S. Patent No. 6,763,345.
Claim Chart for US Patent 6,763,345.
Index to File History of U.S. Patent No. 5,243,725.
Terminal Disclaimer to Obviate a Double Patenting Rejection Over a Prior Patent Docket No. 8376-86291, In Re Application of Hempleman, U.S. Appl. No. 09/770,882.
United States Patent and Trademark Office Certificate of Correction, 6,243,725 B1, Jun. 5, 2001, Inventor; James D. Hempleman.
Patent Owner's Admissions Regarding Anticipation of U.S. Patent No. 6,763,345 by DAD.
Prosecution History for U.S. Pat. No. 6,243,725.
McNab, "Towards the Digital Music Library: Tune Retrieval from Acoustic Input," pp. 11-96, Association of Computing Machinery, 1996.
Wold, "Content-Based Classification, Search, and Retrieval of Audio," pp. 27-36, Institute of Electrical and Electronics Engineers, 1996.
Pfeiffer, "Automatic Audio Content Analysis," pp. 21-30, Association of Computing Machinery, 1996.
Woo, Office Action Mailed Jun. 6, 2007 in Application No. 10/841,374, United States Patent & Trademark Office.
Ferris III, Office Action Mailed Oct. 3, 2007 in Reexamination No. 95/000,201, United States Patent & Trademark Office.
Ferris III, Office Action Mailed Oct. 3, 2007 in Reexamination No. 90/008,361, United States Patent & Trademark Office.
"Wegener Announces MPEG-Based System for Broadcasters Using Micropolis Video Servers," Mar. 27, 1995.
AES 76$^{th}$ Convention, NYC, Title: Specifications and Implementation of a Computer Audio Console for Digital Mixing and Recording by David M. Schwartz, CompuSonics Corporation, Denver, CO, Jun. 20 1984.
Securities and Exchange Commission, Washington, DC; Post-Effective Amendment No. 2 to Form S-1 Registration Statement Under the Securities Act, Compusonics Corporation filed with the SEC on Jul. 3, 1985; SEC received date Jul. 3, 1985.
*Antor Media Corporation* v. *Apple Computer, Inc.*, Case No. 2-03CV-320; videotaped deposition of David M. Schwartz on Sep. 22, 2004 at 10:00 am at the office of Weil, Gotshal & Manges LLP, New York, NY.
SBE, 2400 Bisso Lane, Concord, CA; Begulus 4.2: List of Changes; REGULUS 4.2 differs from REGULUS 4.1.
AES 76$^{th}$ Convention, NYC, Title: Strategies for the Representation and Date Reduction of Digital Music Signals by John P. Stautner, CompuSonics Corp. Cambridge, MA; Jun. 20, 1984.
A High Speed Telecommunications Interface for Digital Audio Transmission and Reception by Hyun Heinz Sohn, Shugart Corporation, Sunnydale, CA for CompuSonics Corporation.
AES 76$^{th}$ Convention Oct. 8-11, 1984 New York; Specification and Implementation of a Computer Audio Console for Digital Mixing and Recording by David M. Schwartz, CompuSonics Corporation, Denver, Co.
CompuSound, Inc., Denver, CO; Jan. 6, 1984; Letter to Shareholder from David M. Schwartz, President.
CompuSonics, Denver, CO; May 31, 1985; Letter to Shareholder from David M. Schwartz, President.
Engineering Your Own Digital Audio Broadcast System by David M. Schwartz, CompuSonics Corporation, Palo Alto, CA.
Description of the word "Playlist" from Wikipedia from Mar. 9, 2007.
The Concise Oxford Dictionary of Current English.
Microsoft Press Computer Dictionary, 1997.

Mix Your Music in Playlists, Oct. 2005.
Create a playlist with Windows Media Player, Nov. 9, 2005.
PC World Apr. 1985, "Hi-Fi Floppy"; Author: Keith Yates.
Upfront; "High-Tech: New technology challenges the Compact Disc".
The New York Times; Aug. 12, 1996; Technology: Digital Commerce; New ways of sending radio over the Net promise more sound less static; by John Markoff.
*Medtronic Ave, Inc., v. Cordis Corp*; Civil Aciton No. 2-03-CV-212 (TJW).
Federal Register/vol. 72, No. 195/Wednesday, Oct. 10, 2007/Notices.
*Premier v. Apple*, No. 2-05CV-506 TJW, Declaration of Andrew W. Spangler.
*Premier v. Apple*, No. 2-05CV-506 TJW, Plaintiff Premier International's Reply Brief to Defendant Apple Computer's Claim Construction Brief.
*Premier v. Apple*, No. 2-05CV-506 TJW, Plaintiff Premier International Associates, L.L.C. Responses and Objections to Defendant's First Set of Interrogatories.
*Premier v. Apple*, No. 2-05CV-506 TJW, Plaintiff Premier International Associates, L.L.C.'s Updated Response and Objections to Defendant's First Interrogatory.
*Premier v. Apple*, No. 2-05CV-506, First Amended Complaint for Patent Infringement.
*Premier v. Apple*, No. 2-05CV-506 (TJW) Order of Dismissal.
*Premier v. Microsoft*, No. 2-07CV-396, Complaint for Patent Infringement.
*Premier v. Microsoft*, No. 2-07CV-395, Complaint for Patent Infringement.
Crossfade Screen Function Buttons.
Audio Times, vol. 26 (Not sure of vol. No.), No. 5, May 1984, Summer CES Preview.
Articles from Seattle WA Times: Hearing the future; Sound is big at consumer show.
Consumer Electronics; CES Special; Jun. 84, vol. 12; Watch out digital discs: here comes floppy audio.
CompuSonics DSP-1000 Digital Disk Recorder/Player, Preliminary Specifications; Copyright 1984 CompuSonics Corporation.
Picture of CompuSonics at Electronics Show.
Picture of CompuSonics at Electronics Show.
May 21, 1984; Some type of digest—Article concerning the Consumer Electronics.
Pro Sound News, New York, NY; Jun. 8, 1984; Article: CompuSonic Bows—Totally Digital.
CompuSonics DSP 1000 Digital Audio Disk Recorcer article.
Friday Jun. 6, 1997; America Online: DUNE321; download of CD/Spectrum Pro 3.2; DC-Audio Player with Graphical Spectrum Analyzer by Jared DuBois.
*Premier International v. Apple Computer*; Plaintiff Premier International's Opening Brief Regarding Claim Construction; Filed Apr. 16, 2007.
Radio Computing Services, Inc., Selector The Music Scheduling System Manual, Jan. 1991.
Wegener Announces MPEG-2 Based System for Broadcasters Using Micropolis Video Servers, Mar. 27, 1995.
*Premier v. Apple Computer*—First Amended Complaint for Patent Infringement filed Dec. 7, 2005.
Terminal Disclaimer to Obviate a Double Patenting Rejection Over a Prior Patent; U.S. Appl. No. 09/770882; Filing Date: Jan. 26, 2001 in Re Application of Hempleman et al.
File Wraper for the 6,763,345 Patent Jul. 13, 2004.
Claim Chart—Table 1—Dependency Relationship of Claim 2 and 1; The alleged invention recited in claims 2 and 1 of the '725 patent.
File Wrapper for the 6,243,725 Patent Jun. 5, 2001.
Certificate of Mailing on May 21, 1997 for U.S. Appl. No. 08/859,995; Amendment A.
US Patent Search entered at 09:51:49 on Jan. 19, 1999; 2 pages.
Office Action Summary U.S. Appl. No. 08/859,995; Detailed Action; 6 pages; May 21, 1997/Oct. 22, 1998.
Petition for Extension of Time, May 24, 1999 for U.S. Appl. No. 08/859,995.
Continued Prosecution Application Request Transmittal for U.S. Appl. No. 08/859,995 on May 24, 1999.

US Patent Search on Jun. 16, 1999; 6 pages.
Office Action for U.S. Appl. No. 08/859,995 in response to CPA filed on May 24, 1999; 7 pages.
Wildcard search done on Oct. 1, 1999; 4 pages.
Video information providing/receiving system. Search done on Mar. 24, 2000. 7 pages.
System having client sending edit commands to server during transmission of continuous media from one clip in play list for editing the play list. 12 pages. Mar. 24, 2000.
*Premier v. HP*—Amended Complaint.
*Premier v. HP*—Complaint.
*Premier v. HP*—Order to Stay.
*Premier v. HP*—Amended Complaint.
*Premier v. HP*—At&T Answer.
*Premier v. HP*—Complaint.
*Premier v. HP*—Amazon Answer.
*Premier v. HP*—Gateway Answer.
*Premier v. HP*—HP Answer.
*Premier v. HP*—Yahoo Answer.
*Premier v. Microsoft*-Lenovo Answer.
*Premier v. Microsoft*-Order to Stay.
*Premier v. Microsoft*-Dell Answer.
*Premier v. Microsoft*LG Answer.
*Premier v. Microsoft*Microsoft Answer.
*Premier v. Microsoft*Motorola Answer.
*Premier v. Microsoft*Napster Answer.
*Premier v. Microsoft*Nokia Answer.
*Premier v. Microsoft*RealNetworks Answer.
*Premier v. Microsoft*Samsung Answer.
*Premier v. Microsoft*Sandisk Answer.
*Premier v. Microsoft*Sprint Spectrum Answer.
*Premier v. Microsoft*Toshiba Answer.
*Premier v. Microsoft*Verizon Answer.
*Premier v. Microsoft*Viacom Answer.
Unknown, Music Databases, Unknow publication date, MP3 Developments.
Thomson ONE Banker-Filings List; Compusonics Corp.; p. 2 of 5; http//banker_thomsonib_com/ta/ TAFilingsList_asnx?Mode=Companies&Tab-Documents&; Jun. 6, 2007; (1 pq.).
Thomson ONE Banker-Filings List; Compusonics Corp.; p. 2 of 5; http//banker_thomsonib_com/ta/ TAFilingsList_asnx?Mode=Companies&Tab-Documents&; Jun. 6, 2007; (1 pg.).
CompuSonics; Excerpt of Annual Report 1886; (73 pgs.).
Company Names: American Telephone and Telegraph Co.—Information services; Descriptors: Electronic Publishing; Market Entry; Information Storage and Retrieval; Information Services; Marketing Strategy; Telephone Co. Service Merchandising (4 pgs.).
Jun. 21, 1989; NNSC; Copyright Notice; Introduction; Aug. 6, 1989; NNSC Introduction; (4 pgs.).
Meta-Scheduling for Distributed Continuous Media; David P. Anderson; Computer Science Division; EECS Department; University of California at Berkeley, Berkeley, CA 94720; Oct. 4, 1990 (32 pgs.).
Radiology, $75^{th}$ Scientific Assembly and Annual Meeting; Chicago, Nov. 26-Dec. 1, 1989; (3 pgs.).
Computer Communications; vol. 13; No. 4; May 1990; Article-Architecture for distributed multimedia database systems; P.B. Berra, C.Y.R. Chen, A. Ghafoor, C.C. Lin, T.D.C. Little and D. Shin; (16 pgs.).
Government Information Quarterly, vol. 7, No. 2, 1990; Special Issue-National Aeronautics and Space Administration Scientific and Technical Information Programs; Guest Editor: Thomas E. Pinelli (9 pgs.).
Telephony; Monday, Sep. 25, 1989; vol. 217, No. 14; (2 pgs.).
Videotex enters another dimension by Jean Piere Temime.
Ntt Review.
CompuSonic picture of item.
Digital Audio Recording & Editing screen picture.
CompuSonic Screen Shot.
USA Today; Published by Gannett; Computerline.
Digital Audio Telecommunications System Screen Shot.

CompuSonics Corporation; Denver, CO, Fortune Magazine; Article on CompuSonics DSP-1000 by David Schwartz, President; John Stautner, Vice President; James Woodworth, National Sales Manager.

AT&T Communications—Proprietary; Memorandum of Understanding between AT&T Communication, Inc. and CompuSonics Corporation.

CompuSonic picture of item.

PC/Sonics 1500 Users's Guide; Remote Control and Relational Database Software for the CompuSonics DSP 155 & 1200, Preliminary Release Jun. 20, 1987; Copyright 1967 CompuSonics Corporation.

Pages of At-A-Glance 1984 Notes.

CompuSonics, Jun. 14, 1984 Article—Business Plan Overview.

Securities and Exchange Commission; Amendment No. 1 to Post-Effective Amendment No. 2 to From S-1 Registration Statement Under the Securities Act of 1933 received Nov. 25, 1985; CompuSonics Corporation.

Prospectus dated Sep. 11, 1986; Warrant Agent: American Stock Transfer Incorporated in Lakewood, CO; Compusonics Corporation.

Friday, Jun. 21, 1985; Source File-Package-Package Source-Hardware of System Configuration File; Dated Edited: Feb. 11, 1985 and Jan. 21, 1985.

Friday, Jun. 21, 1985; Source File-Package-Package Source-Hardware of System Configuration File; Ed Date: Feb 20, 1985, Feb. 5, 1985, Jan. 22, 1985.

Friday, Jun. 21 1985; Directory/CS/libdsp.

Prototype of User Documentation for DSP Library; CompuSonics Corp., dmh (author).

Crossfade Screen subwindows: A. Selection subwindow; B. Configuration.

High Fidelity; Audio Video Article.

International Audio Video; Manufacturing Update; Jun. 1984.

IntoWorld; The Newsweekly for Microcomputer Users; From the News Desk.

Mix; Digital Discussions; CompuSonics: Another Digital Audio Standard.

CES Daily News; Jun. 2, 1984; Digital Audio With a Disk.

Article—Video Explosion on the Way for Buyers.

AES 76$^{th}$ Convention Oct. 8-11, 1984 New York; A High Speed Telecommunications Interface for Digital Audio Transmission and Reception by Hyun Heinz Sohn, CompuSonics Corp., Cambridge, MA.

CompuSonics DSP 2002 Version 1.00 Preliminary User Manual; Aug. 28, 1985; Copyright 1985, CompuSonics Corporation.

CompuSonics, Denver, CO; Executive Summary of a Proposed Video Floppy Disk Company.

CompuSonics Corporation, Jun. 7, 1998; Digital Marketing Corporation Video Real Estate System.

Interesting-People Message; Subject: PN's announcement of RealAudio (nice new product I had betaed) from David Farber; dated Monday, Apr. 10, 1995.

NAB Broadcasters—MultiMedia World Daily News; Apr. 11, 1995; News Articles.

The Compusonics DSP-1000 brochure (best available copy); Copyright 1986; (3 pages).

The Compusonics DSP-2002 brochure (best available copy); Copyright 1985; (6 pages).

The Digital Recording Report; dated Apr. 1986; vol. 3, No. 4; (8 pages).

"The Search for the Digital Recorder"; dated Nov. 12, 1984; (2 pages).

"Towards the Digital Music Library: Tune Retrieval from Acoustic Input," McNab et al., DL '96, ACM 0-89791-830-4/96, ACM 1996.

USA Today; Computerline "Spin a Musical Disk on Personal Computer"; (1 page).

Office Action for U.S. Appl. No. 90/008,374.

Office Action for U.S. Appl. No. 90/008,361.

Reexamination 6,763,345.

Getting Started With REGULUS, SBE Version, Oct. 25, 1984.

*Premier International* v. *Apple Computer*; Defendant Apple Computer, Inc.'s Preliminary Invalidity Contentions; Civil Action No. 2:05CV506 TJW; Filed Aug. 21, 2006.

Introduction to the RealAudio Player Plus; Copyright 1996 Progressive Networks Inc., Seattle, WA.

RealAudio Content Creation Guide; RealAudio Encoder Release 2.0; Progress Networks, Inc.; Copyright 1995, 1996.

RealAudio Server Administrator's Guide Release 2.0; Progress Networks, Inc.; Copyright 1995, 1996.

The DADPRO Digital Audio Delivery System; Operation Manual Version 1.0; Copyright 1996 by ENCO Systems, Inc.

Computer Magazine Jun. 1992; Article—Random-access digital audio-recording systems by Daryl Lowery, Berklee College of Music.

Dialog File; Gale Group Newsletter; Copyright 2006 The Gale Group; Wegener Announces MPEG-2 Based System for Broadcasters Using Micropolis Video Servers; Mar. 27, 1995.

Interchi'93; Apr. 24-29, 1993; Comparative Design Review: An Exercise in Parallel Design; Moderator: Jakob Nielsen, Bellcore.

*Premier International* v. *Apple Computer*; Parties Compliance with Patent Rule 4-3; Case No. 2-05CV-506 TJW; Filed Mar. 9, 2007.

DADPRO; Digital Audio Delivery System workstation guide; ENCO America; Farmington, MI; Website: http..www.enco.com.

AES 76$^{th}$ Convention, NYC; Title: A High Speed Telecommunications Interface for Digital Audio Transmission and Reception by Hyun Heinz Sohn, CompuSonics Corporation, Cambridge, MA; Jun. 20, 1984.

U.S. Securities and Exchange Commission, Washington, DC; Form 8 and 10-K, Amendment to Application or Report Filed Pursuant to Section 12, 13 or 13(d); Compusonics Video Corporation; Nov. 3, 1986.

Securities and Exchange Commission, Washington, DC, Form 10-K, Annual Report Pursuant to Section 13 or 15(d) for Fiscal Year Ended Jul. 31, 1987; Compusonics Video Corporation.

Liquid Audio, Liquid Player Five, The CD Quality Music Player for the Internet; Copyright 1999 Liquid Audio Inc.

CompuSonics Corp., Cambridge, MA; Friday, Jun. 21 05:28:27 1985; Date Edited: Feb. 11, 1985, Jan. 21, 1985; arith.c contains modular arithmetic routines for use in data reduction code.

CompuSonics Corp., Cambridge, MA; Jun. 21 05:28:27 1985; Edit Date: Feb. 20, 1985, Feb. 5, 1985, Jan. 22, 1985; b_alloc.c contains the routine b_alloc( ) which uses calloc to allocate memory for a buffer of specified length and specified type.

CompuSonics Corp.; Friday, Jun. 21 05:28:27 1985; Computer Printout Sheet.

The Digital Recording Report Apr. 1986; Presenting, DC1 . . . Philips and Sony Announce CD Standard for Interactive Data.

*Sightsound* vs. *N2K, Inc.*; Deposition of David M. Schwartz, Thursday, Feb. 1, 2001, vol. 1; Reported by Frances Ann Weinrob.

CompuSonics Corp., dmh (author) Prototype of User Documentation for DSP Library.

New York Post, Monday, Jun. 1985; Edited by Jane Elli; Trends, The Post Salutes Fathers and Offers Some Imaginative Gift Ideas for Next Sunday; Articles (1 pg.).

The Recording Industry Magazine; Mix, Aug. 1984; Danny "Kootch" Kortchman Computerized Music Sound for the Olympics; Digital Discussion-CompuSonics: Another Digital Audio Standard (3 pgs.).

PC Week; Aug. 29, 1988; vol. 5 No. 35; Section 1 of 2, The National Newspaper of Corporate Microcomputing (2 pgs.).

Forbs, Dec. 29, 1986; vol. 138; Article (3 pgs.).

Time Inc., Fortune, Nov. 12, 1984; Domestic Edition; Section: Technology; p. 116; Headline: The Search for the Digital Recorder; Byline: Brian Dumaine (2 pgs.).

Information Access Company, a thomson Corporation Company; HFT—The Weekly Home Furnishings Newspaper; Mar. 30, 1987; Headline: CompuSonics eyes options; will flagship computer make direct CD copies: Byline: Harrington, Mark (2 pgs.).

Musical Recording, Editing and Production using the CompuSonics DSP-2004; John P. Stautner; CompuSonics Corporation, Cambridge, MA 02139; Abstract (2 pgs.).

Thomson ONE Banker-Filings List; Compusonics Corp.; p. 5 of 5; http//banker_thomsonib_com/ta/
TAFilingsList_asnx?Mode=Companies&Tab-Documents&; Jun. 6, 2007; (1 pg.).

Thomson ONE Banker-Filings List; Compusonics Corp.; p. 4 of 5; http//banker_thomsonib_com/ta/ TAFilingsList_asnx?Mode=Companies&Tab-Documents&; Jun. 6, 2007; (1 pg.).
Thomson ONE Banker-Filings List; Compusonics Corp.; p. 3 of 5; http//banker_thomsonib_com/ta/ TAFilingsListasnx?Mode=Companies&Tab-Documents&; Jun. 6, 2007; (1 pg.).
Video-on-Demand; Jul. 25, 2005; 3 pages.
*Premier* v. *Apple* in Civil Action No. 2:05-CV-506 (TJW); 1 page Order of Dismissal.
Civil Cover Sheet; 1 page; Sep. 11, 2007.
Plaintiff Premier International's Opening Brief Regarding Claim Construction; 13 pages; No. 2:05-CV-506 TJW; Apr. 16, 2007.
Plaintiff Premier International's Reply Brief to Defendant Apple Computer's Claim Construction Brief; No. 2:05-CV-506 TJW; 21 pages; May 7, 2007.
F.Supp.2d, 2007 WL 1189855 (E.D. Tex); 11 pages.
Order for Motion to Stay in *Premier* v. *HP* No. 2:07-CV-395 and *Premier* v. *Microsoft* 2:07-CV-396 (DF); 14 pages; May 19, 2008.
Federal Register/vol. 72 No. 195/Wednesday, Oct. 10, 2007/Notices.
CD/Spectrum Pro 3.2 "CD-Audio Player with Graphical Spectrum Analyzer"; 4 pages, Jun. 19, 1997.
List of software programs that play and organize content from CD discs. 48 pages.
"Download favorite music from Web into computer" from Daily Herald on Dec. 1, 1997; 2 pages.
Plugged in, "Recorded music coming to the Web, but it'll cost more than 3 plays for a quarter: World Wide Wurlitzer"; Aug. 3, 1997; 1 page.
CompuSonics, Denver, CO; Executive Summary of a Proposed Video Floppy Disk Company.
Pay Per Listen Cable Audio System; Copyright 1990 CompuSonics Corp.; Provide the in-home music taper with a wide variety of source material that is perceptually CD-quality via single cable TV channel.
Pay Per Listen Cable Audio System; Copyright 1990 CompuSonics Corp., System Payback Analysis.
Pay Per Listen Cable Audio System; Copyright 1990 CompuSonics Corp., Notes to Viewgraph Presentation.
CompuSonics, Palo Alto, CA; Fax to: Michael Kapp, President, Warner Bros. Special Products; From: David Schwartz, Chairman, CompuSonics; dated Apr. 26, 1990; re CSC Pay Per Listen System.
Compusonics wants to create a missing link; It claims it already has evolved audio technology beyond DAT by John (unable to make out last name) Mercury News Business Writer.
Into World; The Newsweekly for Microcomputer Users; vol. 6, Issue 23, May 11, 1984; From the News Desk.
Stereo Review; New Hi-Fi Horizons; CompuSonics system for recording on floppy discs may have far-reaching technological effects by David Ranada.
Digital Audio and Compact Disc Review, A W/GE Publication; Sep. 1985.
High-Tech; New technology challenges the Compact Disc.
Audio Times; The Industry's Only Newspaper, vol. 26, No. 5; May 1984; Summer CES Preview—Digital Recording System Uses Floppy Discs.
Consumer Electronics, Jun. 84, vol. 12; Watch out digital discs: Here comes floppy audio.
See It. Hear It. Booth W314—Advertisement for show/convention.
1984; Picture; The first CompuSonics professional all digital computer audio recording system has been delivered to Vitello & Associates of Hollywood, CA.
The AES Show in Chicago, Summer of 1985, Pictures; The DSP-1000 Digital Disk Recorder/Player.
CompuSonics Video, 1985; Screen Shot.
CompuSound DSP-1000 picture of item.
CompuSonics Video; DVR-1 Digital Video Recorder information sheet.
Architecture of a Real-Time Digital Filterbank Processor for Tempered, Auditory, and Critical-Band Analysis/Synthesis by Gary W. Schwede.

Architecture of a Real-Time Digital Filterbank Processor for Tempered, Auditory, and Critical-Band Analysis/Synthesis—Abstract by Gary W. Schwede.
The Audio Computer and Its Applications by David Schwartz and John Stautner, CompuSonics Corporation, Palo Alto, CA.
Google Search: compusonics; http://groups.google.com/groups?q=compusonics&hl=en&lr=&ie=UTF-8&oe=UTF-8&as...; Apr. 1, 2004; Subject: Re: New digital audio recorder-more specs.
Google Search:compusonics; htt://groups.google.com/groups?q=compusonics&hl=en&lr=&ie=UTF-8&oe=UTF-8&as...; Apr. 1, 2004; Subject: Re: Why change to CD (still!).
CompuSonics Corporation, Business, General-Article.
CompuSonics; PC/Sonics; Remote Control and Relational Database Software; CompuSonics Corporation; Palo Alto, CA; Copyright 1987 CompuSonics Corp.
Unknown article—News—concerning CompuSonics DSP 2002.
BM/E, Broadcast Management Engineering, Oct. 1985; Station Automation; from the Stanford University Libraries Nov. 12, 1985.
Sight & Sound Marketing, Sep. 1984; 10 Ways to Plug into Holiday Sales; Audio Components, Multiple Choice CD Players Help Spur Market Demand.
Science Digest; Nov. 1984; Technology/Digest-Floppy-Disk Audio System—High-quality digital recordings can soon be made at home.
CompuSonic DSP-1000; First Home Digital Disc Recorder premiered at the Jun. 1984 Consumer Electronics Show.
Toward Electronic Delivery of Music Sending and Receiving High Fidelity Digital Music by John P. Stautner, CompuSonics Corporation, Palo Alto, CA; presented at the ISDN '89; held Apr. 17-21, 1989 at Cervantes Convention Center in St. Louis, MO.
AES; A High Speed Telecommunications Interface for Digital Audio Transmission and Reception by Hyun Heinz Sohn, CompuSonics Corporation, Cambridge, MA presented at the $76^{th}$ Convention Oct. 8-11, 1984 New York.
Securities and Exchange Commission, Washington, D.C.; Filed Aug. 25, 1986; Post-Effective Amendment No. 8 to Form S-1 Registration Statement Under the Securities Act of 1933, CompuSonics Corporation.
CompuSonics, Denver, CO, Apr. 5, 1985; Executive Summary.
AES; Specifications and Implementation of a Computer Audio Console for Digital Mixing and Recording by David M. Schwartz, CompuSonics Corporation, Denver, CO presented at the $76^{th}$ Convention Oct. 8-11, 1984 New York.
DocuStore TM Specification Sheets/Brochure; Document Imaging Systems Corporation, Sunnyvale, CA.
Oct. 1985 BME (Broadcase Management Engineers); Best Available Copy; Articles—Station Automation.
Digital Audio, Sep. 1985, vol. II, No. 1 Articles.
The International Newsmagazine for the Professional Sound Production Industry, Sep. 9, 1985, vol. 7, No. 8; CompuSonics/Carts AT&T Demo.
1985 Electronics Show Had Variety of New Home Equipment—CompuSonics Articles.
CD Player Screen Shot.
Wave Station Digital Audio Automation System; Instruction & Operations Manual; BSI Broadcast Software International; Copyright 1997; Email: info@bsiusa.com; WEB: www.bsiusa.com.
Sony; Portable MiniDisc Recorder; MZ-1 Operating Instructions.
Tektronix; New Star; News Automation and Editing System; Digital news production and management at the speed of thought.
PBS; Local Insertion Server Instruction Manual; LIS01 Jun. 19, 1996 prelim.; Microvision, Inc., Budd Lake, NJ.
RCS Log Editor; RCS Works, The Log Editor, User's Guide and Reference Manual; Software Version 3.5 (Sep. 1993) Scarsdale, New York; by Richard Byrne and Karen Murphy.
LaKart-200; Multi-Channel Automation System Instruction Manual.
Radio World; Buyers Guide; User Report; Reprinted from Jun. 26, 1996; CartWorks Eases Labor Pains by Chris Bailey, Production Director, WJDX (FM).
Tektronix; Profile Professional Disk Recorder PDR 100; Copyright 1996, Tektronix.
Horowitz Television Technology; Aug. 17, 2006; Computer Video Reprinted From Dec. 1994; TV Technology; N1 Finds a Match with Louth by Chandos Mahon, Executive V.P., Network One.

Article—Louth ON AIR; Louth. The Experience. The Confidence. Making Waves; Lake Systems Corporation, Newton, MA; Affordable Random Access Video Cart Systems.

Grass Valley Group; Integrated Production System, IPS 100 Operator's Guide; Copyright 1988 The Grass Valley Group, Inc., Grass Valley, CA.

Howard W. Sams & Company Audio Library; Audio Production Techniques for Video by David Miles Huber; Foreword by David Schwartz; Publisher Mix Magazine; Copyright 1987 by David Miles Huber; First Edition, First Printing-1987.

Search; http://www.lexis.com/research/retrieve?_m=d2a78a466b80a4f92fb5958...; Copyright 1995 The New York Times Company; Apr. 10, 1995, Monday, Late Edition-Final; Headline: Information Technology; Internet Audio Minus the Delays is Set to Start on the Web Today by Laurence Zuckerman.

RCS Generic; RCS Works OG2; The On Air Workstation Users Guide and Reference Manual; Software Version 3.5 (Sep. 1993) RCS, Scarsdale, NY; Karen Murphy et al.

Screenshot; Directory Screen; CompuSonics DSP 2000; Copyright 1985; CompuSonics Corporation; Version 1.02.

CompuSonics DSP 2002; Harnessing the Power of the Computer Without Changing the Way You Work.

HFD-The Weekly Home Furnishings Newspaper, Mar. 30, 1987, Copyright 1987 Capital Cities Media Inc.; Headline: CompuSonics eyes options; will flagship computer make direct CD copies?; BvLine: Harrington, Mark.

Fortune, Nov. 12, 1984; Technology; The Search for the Digital Recorder.

Audio Computer Owners Guide, CompuSonics DSP 1000; DSP 1000 Owner's Guide Version 1.00; Copyright 1987 CompuSonics Corporation, Palo Alto, CA.

CompuSonics 1988 Produce Line; CompuSonics Corporation, Palo Alto, CA; Copyright 1988.

Consumer Electronics Show Daily, Sunday, Jun. 3, 1984; Digital Sound Now on Computer Disks, New Floppy Diskette format Bows Here by Stephen A. Booth.

CompuSonics, Application Notes, DSP 1000 Digital Audio Disk Recorder; Copyright 1986 CompuSonics Corp., Palo Alto, CA.

ISDN '89 held Apr. 17-21, 1989 at Cervantes Convention Center, St. Louis, MO; Toward Electronic Delivery of Music Sending and Receiving High Fidelity Digital Music by John P. Stautner, CompuSonics Corporation, Palo Alto, CA.

Proceedings of SPIE—The International Society for Optical Engineering; vol. 899; Optical Storage Technology and Applications by Carlin, Tsunoda and Jamberdino, Chairs/Editors; Jan. 12-15, 1988, Los Angeles, CA.

Digital Video Interactive; The Technology and Its Applications by R. N. Hurst; SPIE vol. 899 Optical Storage Technlogy and Applications (1988).

A Distributed Multimedia Database System by Arif Ghafoor, C.Y. Roger Chen and P. Bruce Berra, Department of Electrical and Computer Engineering, Link Hall, Syracuse University, Syracuse, NY; Copyright 1988 IEEE.

ICC 91 International Conference on Communications; Communications: Rising to the Heights, Jun. 23-26, 1991, Sheraton-Denver Technological Center; Sponsored by the IEEE Communications Socienty and the Denver IEEE Section.

A Store and Forward Architecture for Video-On-Demand Service, A.D. Gelman, H. Kobrinski, L.S. Smoot, S.B. Weinstein, Bellcore, Morristown, NJ and M. Forteir, D. Lemay, BNR, Verdun, Quebec, Canada; Copyright 1991 IEEE.

Sacramento Magazine, Oct. 1984—CompuSonice Article.

Master Control Manual; The Paperless and Cartless Studio System; Verson 3.03.

* cited by examiner

FIG. 4G

PlayList Editor

File  Options  Tables  Help

Recorder | PlayList Editor | PlayList Player | Reports

Media Inventory  [Change Selection]

| Title | Artist | Type | Comments | Date Recorded | Time | In List |
|---|---|---|---|---|---|---|
| Beach baby | Regents | Rock N Roll | | 4/21/97 | 4:22 | yes |
| Count on me | Houston, Whitney | Pop | Audio only | 4/18/97 | 4:27 | yes |
| Da Doo Ron Ron | Crystals | Rock N Roll | | 4/9/97 | 2:23 | yes |
| Do you wanna dance | Freeman, Bobby | Rock N Roll | | 4/21/97 | 2:37 | yes |
| Exhale | Houston, Whitney | Pop | Audio and video | 4/9/97 | 3:25 | yes |
| Fun, fun, fun | Jan & Dean | Rock N Roll | | 4/21/97 | 2:12 | yes |
| Help me Rhonda | Jan & Dean | Rock N Roll | | 4/29/97 | 2:56 | yes |
| I believe in you and me | Houston, Whitney | Bluegrass | | 4/29/97 | 4:02 | yes |
| Let it flow | Braxton, Toni | Pop | Audio only | 4/18/97 | 4:27 | yes |
| Little Honda | Hondells | Rock N Roll | | 4/21/97 | 2:02 | yes |
| My heart is calling | Houston, Whitney | Pop | | 4/29/97 | 4:15 | yes |

Destination PlayList  [Change PlayList]  [Save PlayList]  Title: [Dinner music 1]  Total Play: [1:38:45]

| Title | Artist | Type | Comments | Date Recorded | Total Time |
|---|---|---|---|---|---|
| Surfin' Safari | Beach Boys | Rock N Roll | | 4/9/97 | 2:03 |
| Da Doo Ron Ron | Crystals | Rock N Roll | | 4/9/97 | 4:26 |
| Surfer Girl | Beach Boys | Rock N Roll | | 4/9/97 | 6:42 |
| My heart is calling | Houston, Whitney | Pop | | 4/29/97 | 10:57 |
| Papa oom mow mow | Rivingtons | Rock N Roll | | 4/29/97 | 13:15 |
| Beach baby | Regents | Rock N Roll | | 4/21/97 | 17:37 |
| You were loved | Houston, Whitney | Pop | | 4/29/97 | 21:50 |
| Let it flow | Braxton, Toni | Pop | Audio only | 4/18/97 | 26:17 |
| Help me Rhonda | Jan & Dean | Rock N Roll | | 4/29/97 | 29:13 |
| Count on me | Houston, Whitney | Pop | Audio only | 4/18/97 | 33:40 |

[Play]  [Stop]

Volume  L  R

Current Time: 06:54 pm

FIG. 41

PlayList Editor

File   Options   Tables   Help

Recorder | PlayList Editor | PlayList Player | Reports

Media Inventory   [Change Selection]

| Title | Artist | Type | Comments | Date Recorded | Time | In List |
|---|---|---|---|---|---|---|
| Beach baby | Regents | Rock N Roll | | 4/21/97 | 4:22 | yes |
| Count on me | Houston, Whitney | Pop | Audio only | 4/18/97 | 4:27 | yes |
| Da Doo Ron Ron | Crystals | Rock N Roll | | 4/9/97 | 2:23 | yes |
| Do you wanna dance | Freeman, Bobby | Rock N Roll | | 4/21/97 | 2:37 | yes |
| Exhale | Houston, Whitney | Pop | Audio and video | 4/9/97 | 3:25 | yes |
| Fun, fun, fun | Jan & Dean | | | 4/21/97 | 2:12 | yes |
| Help me Rhonda | Jan & Dean | | | 4/29/97 | 2:56 | yes |
| I believe in you and me | Houston, Wh | | | 4/29/97 | 4:02 | yes |
| Let it flow | Braxton, To | | | 4/18/97 | 4:27 | yes |
| Little Honda | Hondells | | | 4/21/97 | 2:02 | yes |
| My heart is calling | Houston, W | | | 4/29/97 | 4:15 | yes |

Save PlayList

You have edited the current PlayList. Please select how you wish to save the changes

[Save to Existing PlayList]
[Save to New PlayList]
[Discard the Changes]

Destination PlayList  [Change PlayList]  [Save]

| Title | Artist | Type | Comments | Date Recorded | Total Time |
|---|---|---|---|---|---|
| Surfin' Safari | Beach Boys | | | 4/9/97 | 2:03 |
| Da Doo Ron Ron | Crystals | | | 4/9/97 | 4:26 |
| Surfer Girl | Beach Boys | | | 4/9/97 | 6:42 |
| My heart is calling | Houston, W | | | 4/29/97 | 10:57 |
| Papa oom mow mow | Rivingtons | | | 4/29/97 | 13:15 |
| Beach baby | Regents | Rock N Roll | | 4/21/97 | 17:37 |
| You were loved | Houston, Whitney | Pop | | 4/29/97 | 21:50 |
| Let it flow | Braxton, Toni | Pop | Audio only | 4/18/97 | 26:17 |
| Help me Rhonda | Jan & Dean | Rock N Roll | | 4/29/97 | 29:13 |
| Count on me | Houston, Whitney | Pop | Audio only | 4/18/97 | 33:40 |

[OK]

[▲ Play]   [■ Stop]

Volume

Current Time:  07:03 pm

FIG. 4K

| Title | Artist | Type | Comments | Date Recorded | Total Time |
|---|---|---|---|---|---|
| Surfin' Safari | Beach Boys | Rock N Roll | | 4/9/97 | 2:03 |
| Da Doo Ron Ron | Crystals | Rock N Roll | | 4/9/97 | 4:26 |
| Surfer Girl | Beach Boys | Rock N Roll | | 4/9/97 | 6:42 |
| My heart is calling | Houston, Whitney | Pop | | 4/29/97 | 10:57 |
| Papa oom mow mow | Rivingtons | Rock N Roll | | 4/29/97 | 13:15 |
| Beach baby | Regents | Rock N Roll | | 4/21/97 | 17:37 |
| You were loved | Houston, Whitney | Pop | | 4/29/97 | 21:50 |
| Let it flow | Braxton, Toni | Pop | Audio only | 4/29/97 | 25:27 |
| Help me Rhonda | Jan & Dean | Rock N Roll | | 4/29/97 | 29:13 |
| Count on me | Houston, Whitney | Pop | Audio only | 4/18/97 | 33:40 |
| Ride the wild surf | Jan & Dean | Rock N Roll | | 5/1/97 | 35:54 |
| Surfer Girl | Beach Boys | Rock N Roll | | 4/9/97 | 38:10 |
| The little old lady | Jan & Dean | Rock N Roll | | 4/21/97 | 40:40 |
| Let it flow | Braxton, Toni | Pop | Audio only | 4/9/97 | 45:07 |
| Surfin' Safari | Beach Boys | Rock N Roll | | 4/9/97 | 47:10 |
| I believe in you and me | Houston, Whitney | Bluegrass | | 4/29/97 | 51:12 |
| Papa oom mow mow | Rivingtons | Rock N Roll | | 4/29/97 | 53:30 |
| Surfin' bird | Trashmen | Rock N Roll | | 4/21/97 | 55:49 |
| Exhale | Houston, Whitney | Pop | Audio and video | 4/9/97 | 59:14 |
| Wipe out | Surfaris | Rock N Roll | | 4/21/97 | 1:01:31 |
| Pipeline | Chantays | Rock N Roll | | 4/21/97 | 1:03:45 |
| Count on me | Houston, Whitney | Pop | Audio only | 4/18/97 | 1:08:12 |
| Surf City | Jan & Dean | Rock N Roll | | 4/21/97 | 1:10:43 |
| I believe in you and me | Houston, Whitney | Bluegrass | | 4/29/97 | 1:14:45 |
| Surfin' Safari | Beach Boys | Rock N Roll | | 4/9/97 | 1:16:48 |

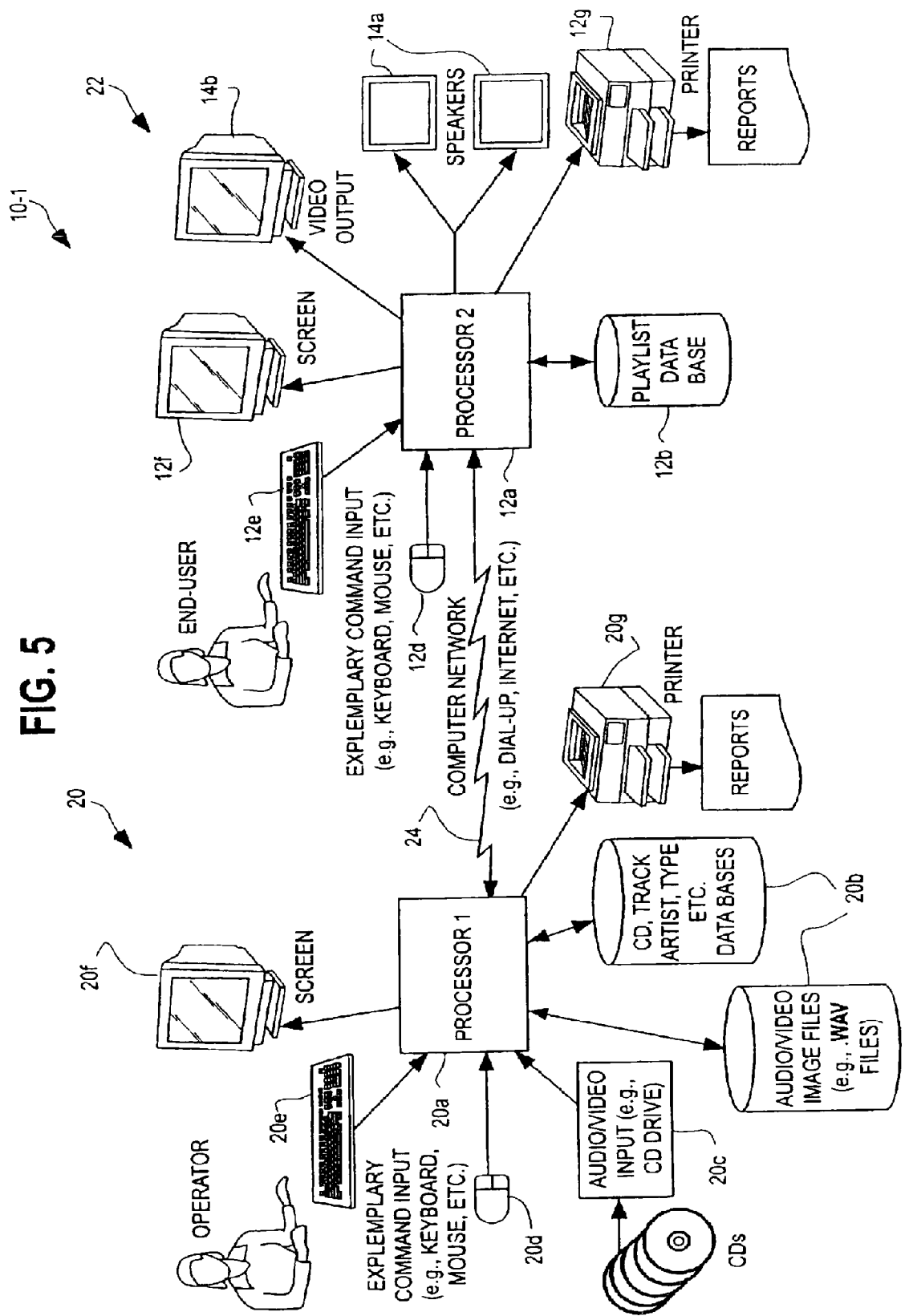

LIST BUILDING SYSTEM

CROSS REFERENCE TO RELATED APPLICATIONS

This application is a continuation application of U.S. patent application Ser. No. 10/841,374 filed May 7, 2004 now abandoned and entitled "LIST BUILDING SYSTEM," which is a continuation of U.S. patent application Ser. No. 09/770,882 filed on Jan. 26, 2001 entitled "LIST BUILDING SYSTEM", now U.S. Pat. No. 6,763,345 issued Jun. 14, 2004, which is a continuation of U.S. patent application Ser. No. 08/859,995 filed on May 21, 1997 entitled "LIST BUILDING SYSTEM", now U.S. Pat. No. 6,243,725 issued Jun. 5, 2001.

FIELD OF THE INVENTION

The invention pertains to software driven systems and methods for developing audio/video sequences. More particularly, the invention pertains to such system and methods wherein a user can create an editable list of works which can be presented.

BACKGROUND OF THE INVENTION

With the advent of CDs a wide variety of music, music videos or video sequences are conveniently available for a user in a non-analog, digital format. The advantages of digital recording of both audio and video have been recognized and are to a great extent realized with the ready availability of pre-recorded CDs.

While convenient, pre-recorded CDs present a problem to a user in that while it is possible to select sequentially between the pre-recorded works on a given CD, to switch to another artist or group it is necessary to have multiple drives available or to remove one CD and insert another at the appropriate time. While possible, such arrangements are at the very least inconvenient. In addition, because of the delays inherent in switching from one CD to another, the audio or video output might be lost for an undesirably long period of time thereby detracting from the ambiance afforded by the performance. In addition, listeners at times are only interested in one or two of the tracks on a CD in a given situation.

There thus continues to be a need for systems and methods which will make it possible to combine works by a variety of performers or artists in a relatively arbitrary fashion and to present those works in a given sequence in a fashion that is convenient but which at the same time is cost effective. It would also be desirable to be able to use widely available personal computers as control elements in such systems.

SUMMARY OF THE INVENTION

A system and a method of arranging media elements for later replay make it possible to create new sequential presentations of the elements. The elements can be obtained from a local medium such as a CD, or a video tape. Alternately, the elements can be obtained from a remote location via wired or wireless transmission. Elements can include audio works such as music or audio/visual works including advertisements, music videos or other types of elements.

The elements can be stored on a readable digital storage medium. Some or all of the elements can be played back or performed individually.

A collection of separate elements can be identified and arranged. One form of arrangement is a list. Another is a non-linear tree-like arrangement.

The collection can be played back or performed sequentially as specified in a list. Alternately, the elements can be performed interactively as specified in a tree. In this embodiment, tree nodes represent decision points for a viewer or a listener.

A graphically-oriented editor is provided for building or editing lists or trees. The lists or trees can be stored and subsequently retrieved for editing or performing the collected media elements.

Output can, in one aspect, be an audible or a visible performance of the elements in accordance with a selected list or tree. In another aspect, the collection can be written to a medium. Hence, a CD or other digital medium can be written, or audio or video tapes can be recorded. The output medium is not a limitation of the invention.

In yet another aspect, a system incorporating a card reader or a vending unit can be used to build a list of elements. In this instance an appropriate credit needs to be established before an element can be added to an on-going collection being performed.

Subsequent to a credit being established and a selection or selections made in accordance with the credit, elements can be added to the list and performed. Elements can be exclusively audio. Alternately, elements can include both audio and video components without limitation.

In yet another aspect, the method includes building a list of media elements which can come from a variety of sources. Preferably, the media elements are storable in a digital format.

Subsequently, the list can be reviewed visually by a user and either modified or edited for the purpose of creating a sequence of media elements to be replayed or presented. Subsequently, the list is executed and the elements are either presented audibly or visually or both in accordance with their characteristics.

In a further aspect, a digitized inventory of media elements can be created by either reading a local digital medium, such as a CD ROM or by receiving, via wireless transmission, digitized sequence of works which can then be stored in the inventory. If desired, the user can preview some or all of any element in the inventory.

Numerous other advantages and features of the present invention will become readily apparent from the following detailed description of the invention and the embodiments thereof, from the claims and from the accompanying drawings.

BRIEF DESCRIPTION OF THE DRAWINGS

FIGS. 4A through 4K illustrate various screens presentable by the control program illustrated in FIGS. 3A through 3P;

FIG. 5 is a block diagram of a system intended to receive audio or visual works from a remote source;

DETAILED DESCRIPTION OF THE PREFERRED EMBODIMENTS

Figure 1:
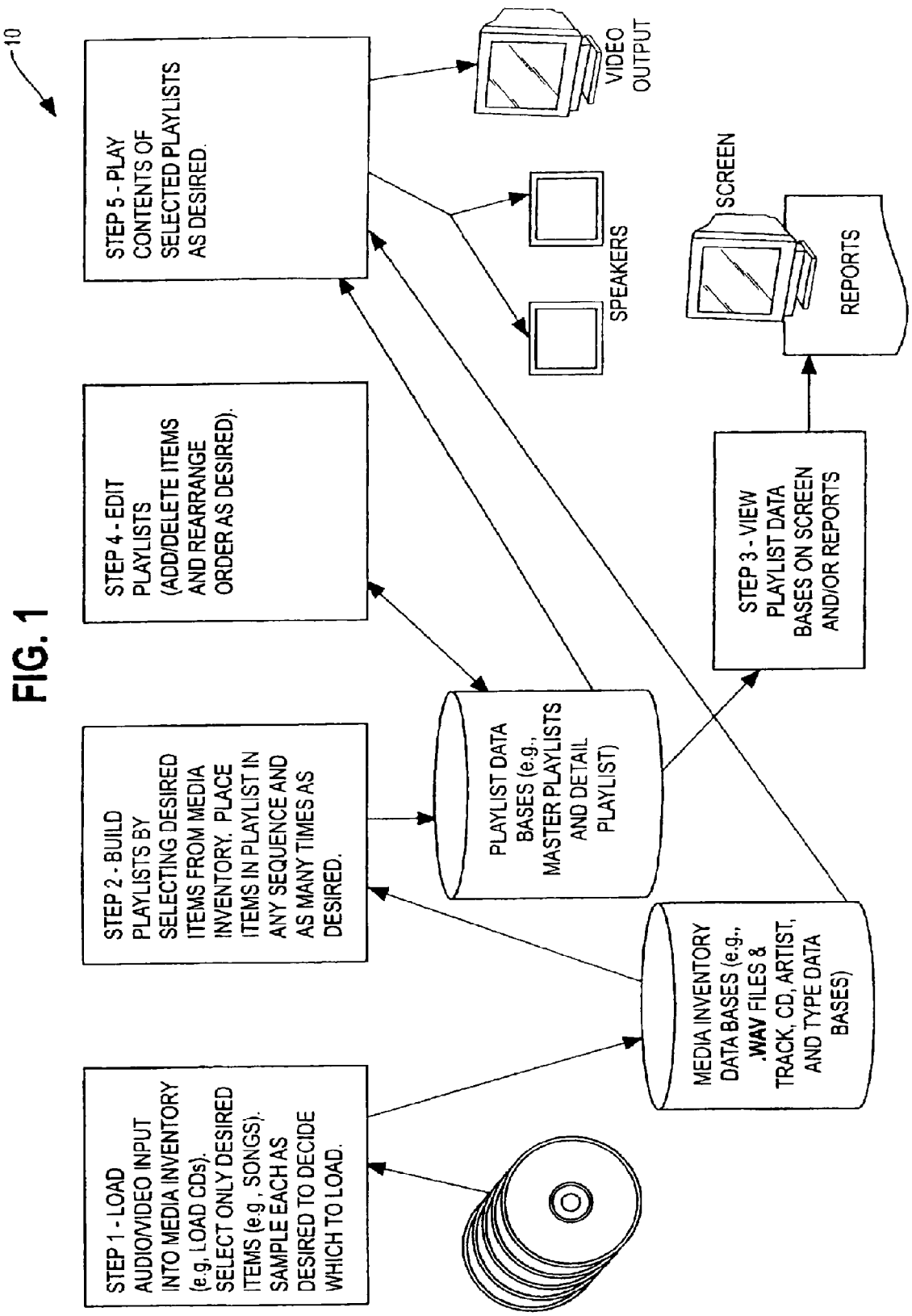
FIG. 1 is an overall flow diagram of a method in accordance with the present invention.

While this invention is susceptible of embodiment in many different forms, there are shown in the drawing and will be described herein in detail specific embodiments thereof with the understanding that the present disclosure is to be considered as an exemplification of the principles of the invention and is not intended to limit the invention to the specific embodiments illustrated.

Systems and methods which embody the present invention enable the user to acquire, for example, digitized audio or audio and video works, which are of interest and which are to be represented either in real time as an audio or an audio/visual work or to be written onto a digital storage medium as part of a sequence selected by the user. Functional capability is provided enabling the user to create one or more composite play or presentation lists which incorporate a plurality of titles or designations of the works in a user selected order. The works could come from a variety of different sources and could include other types of sensory outputs without limitation.

As part of the list preparation process, the user can listen to or view some or all of any of the works. A new list can be graphically created. An existing list can be edited to revise existing works identified in the list, change the order of presentation or to add new ones. Subsequently, the list can be executed and the works performed.

Execution of the list will present the works in the determined sequential order audibly or visually and audibly depending on the nature of the work. Alternately, the works represented on the list can be written to a digital storage medium, such as a CD or DVD for subsequent presentation.

FIG. 1 illustrates steps of a method 10 for preparing executable playlists in accordance with one aspect of the invention. In an initial step, selected audio or video elements can be loaded into a digital database, a media inventory, for review and subsequent presentation. Media elements can be obtained from locally played sources or by wireless signals received from a remote source, such as via an antenna, which are demodulated and stored in digital form in the media inventory.

In the next step, a plurality of playlists can be created by graphically selecting media elements to be entered into a selected list from the inventory. As part of the step, one or more playlist records can be built and stored.

In a subsequent step, the lists in the playlist database can be viewed and various reports concerning the subject list can be created.

In a subsequent step, one or more of the lists can be graphically edited thereupon rearranging items in a list, adding items or deleting items as desired.

Finally, a particular list can be selected and executed. Audio works are presented sequentially, in accordance with the selected list, via audio output transducers, typically speakers. Video works or audio/video works or presented in accordance with the selected list on a video display in combination with speakers.

If desired, a selected list or lists can be written to a storage medium such as a CD ROM for later use. If desired, the associated media elements can also be written on to the medium.

A variety of services can be provided to a user while carrying out the steps of the method 10. Analysis can be conducted of the characteristics of various works. For example, beats per minute can be determined and audio works can be sorted accordingly. A list or lists can be created in accordance with a pre-selected tempo or beats per minute.

Sorting or selecting based on other features of audio or video characteristics of the works can also be included. Presentations via a selected list can be controlled based on selected features.

For record keeping purposes, the number of times a given media element is presented or executed can be logged along with date and time information. Reports reflecting any lists created based on any of the above selection features or characteristics can also be printed for invoicing, billing or royalty payment purposes.

Figure 2:
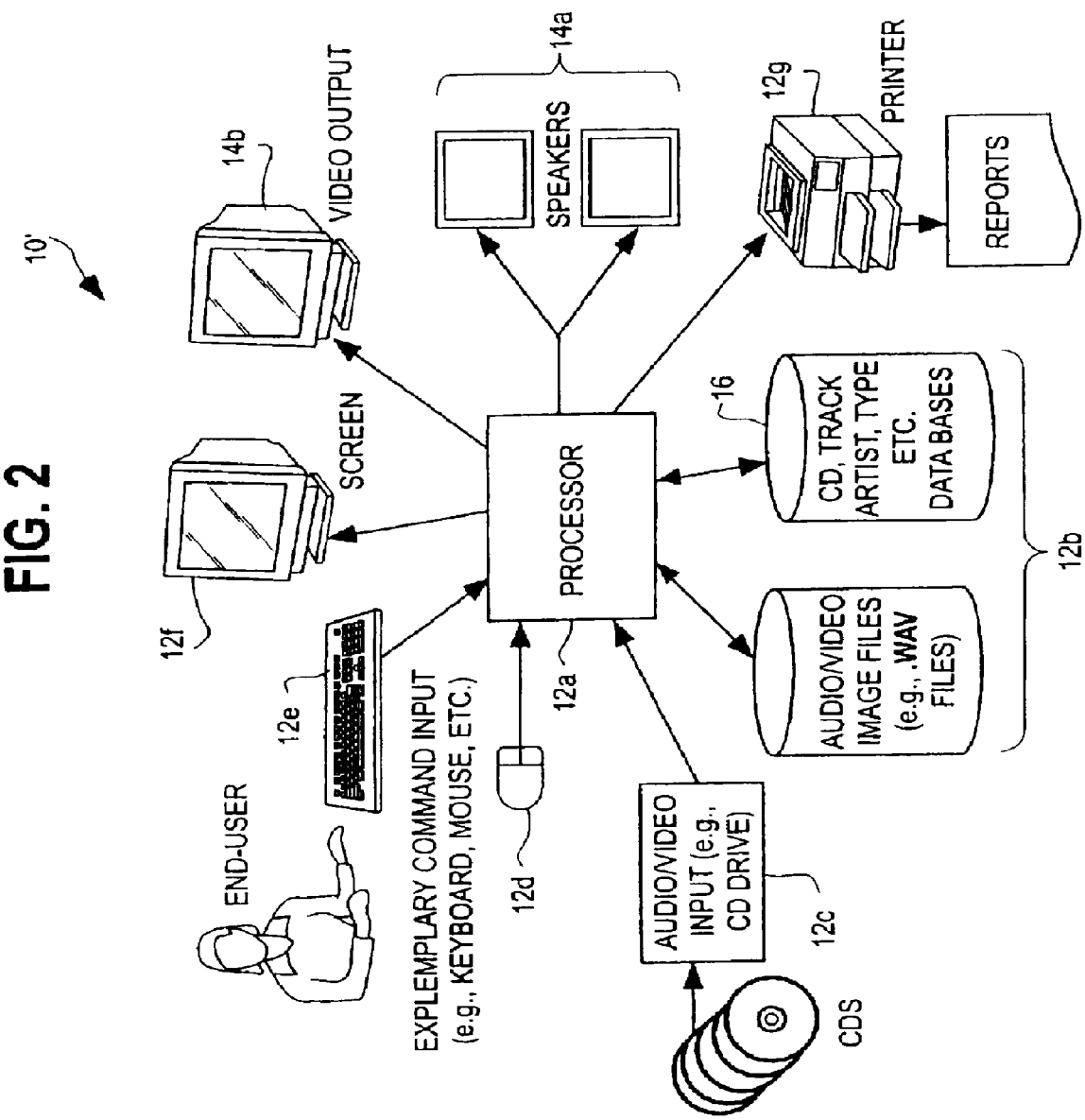
FIG. 2 is a block diagram of a system useable for practicing the method of FIG. 1.

FIG. 2 illustrates in block diagram form a system 10' for implementing the method 10 of FIG. 1. The system 10' incorporates a programmable processor 12a, for example, a personal computer of a selected variety. Coupled to the processor 12a is a mass digital storage medium 12b, such as a hard disk drive for storage of various databases and programs.

Coupled to the processor 12a is a source of digitized audio or audio/visual input signals such as a CD ROM drive 12c. Media elements or works can also be received wirelessly. Also coupled to the processor 12a are user input devices such as a mouse 12d and a keyboard 12e. Other input devices could also be used without limitation.

Output devices include a display screen 12f of a type conventionally used with programmable processors to present visual display of ongoing programs being executed to the user. A printer 12g is available to provide reports.

Audio and video output devices for media elements include speakers 14a and video output device 14b which can be of a size and quality suitable for the type of works being displayed. Other output devices could also be used.

The hardware components of the system 10' interact in accordance with the user inputs and under the control of a control program 16 stored in one of the storage devices 12b. The control program 16 includes pre-created commands for carrying out the method 10 illustrated in FIG. 1.

Figure 3A:
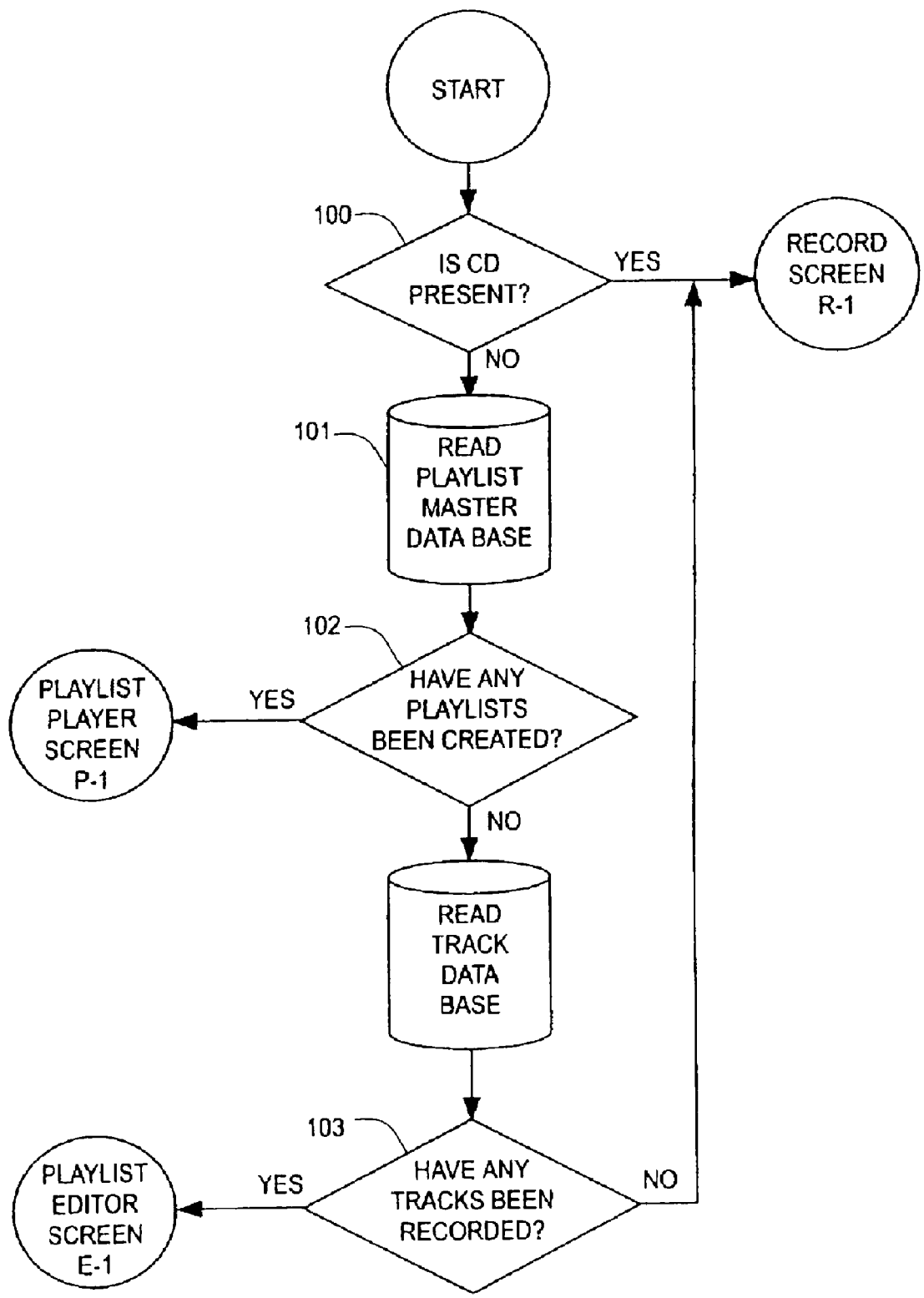
FIGS. 3A through 3P taken together illustrate a flow diagram of a control program useable with the system of FIG. 2.

The control program 16 is described in a set of flow diagrams illustrated in FIGS. 3A . . . 3M. FIGS. 4A-4K illustrate various exemplary displays presented on the display unit 12f while the control program 16 is executing.

Figure 3B:
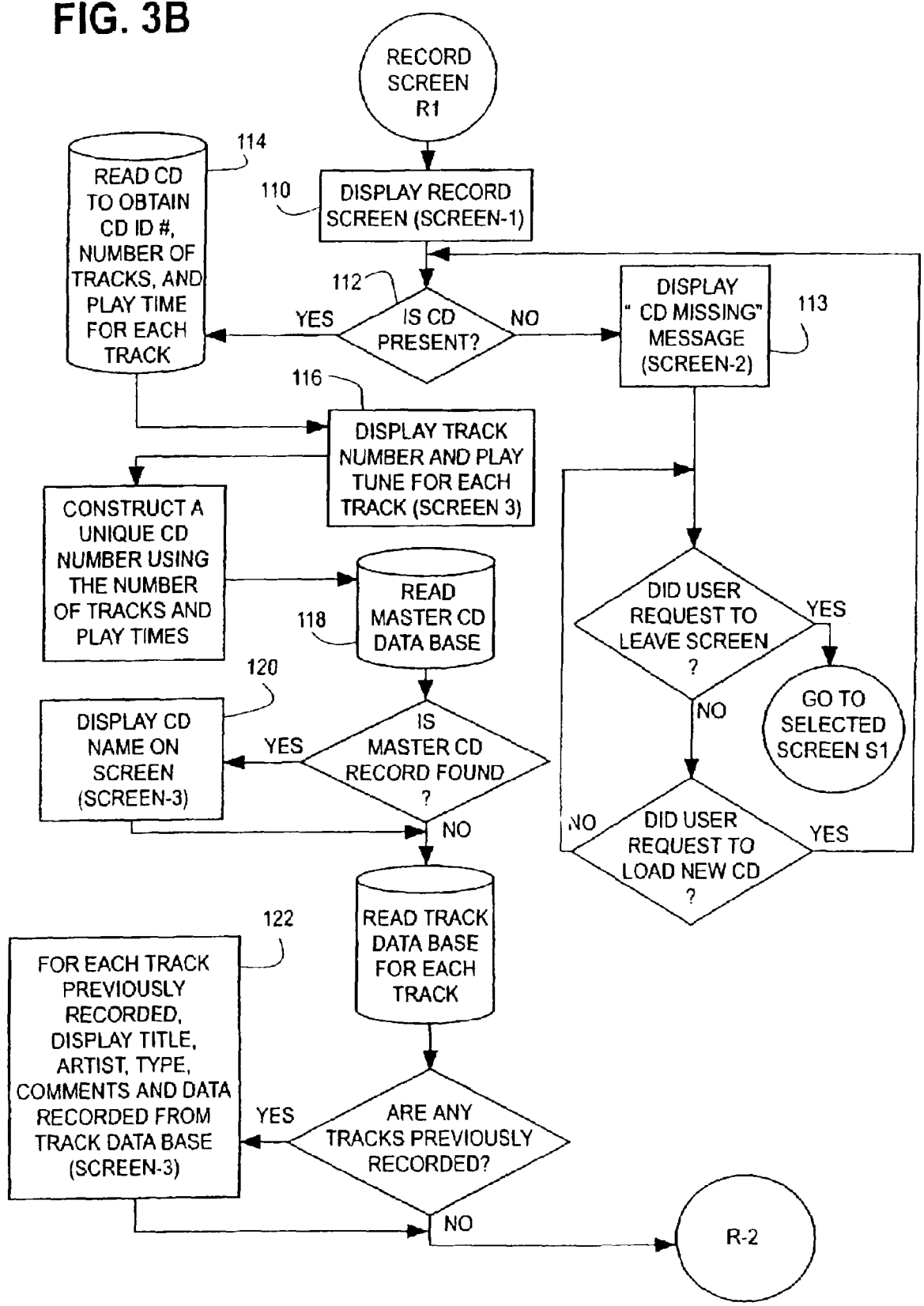
Figure 3C:
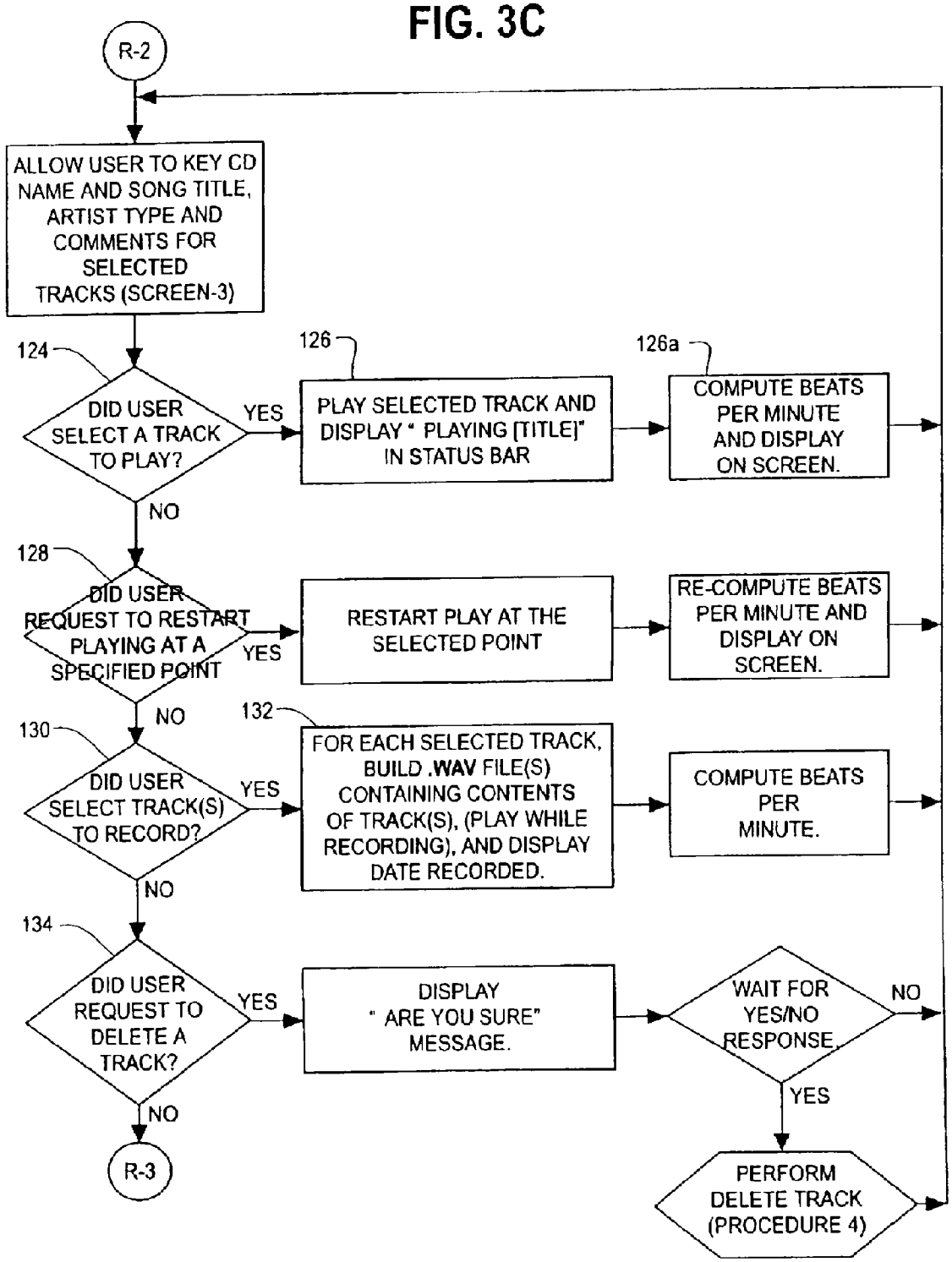
Figure 3D:
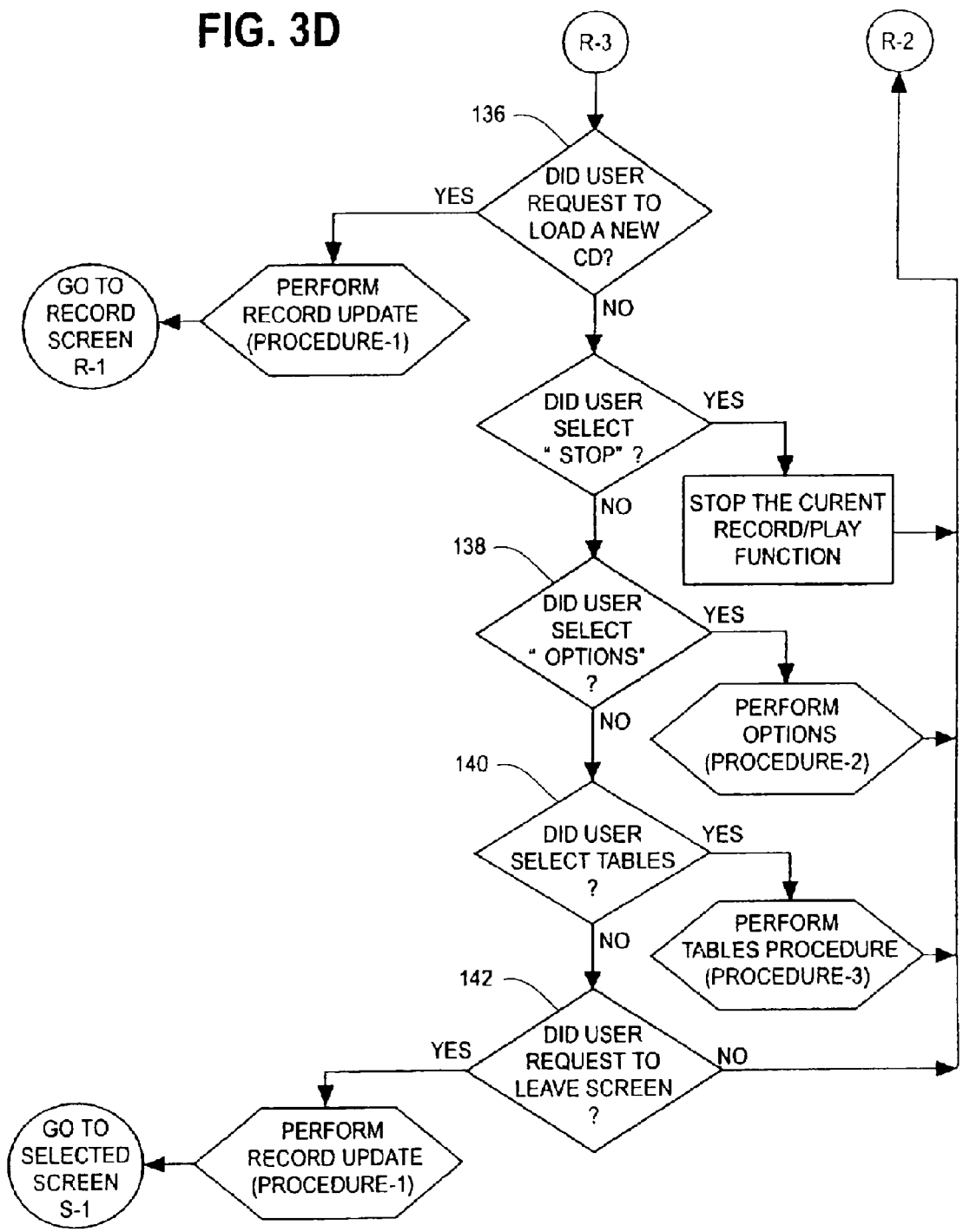
Figure 3E:
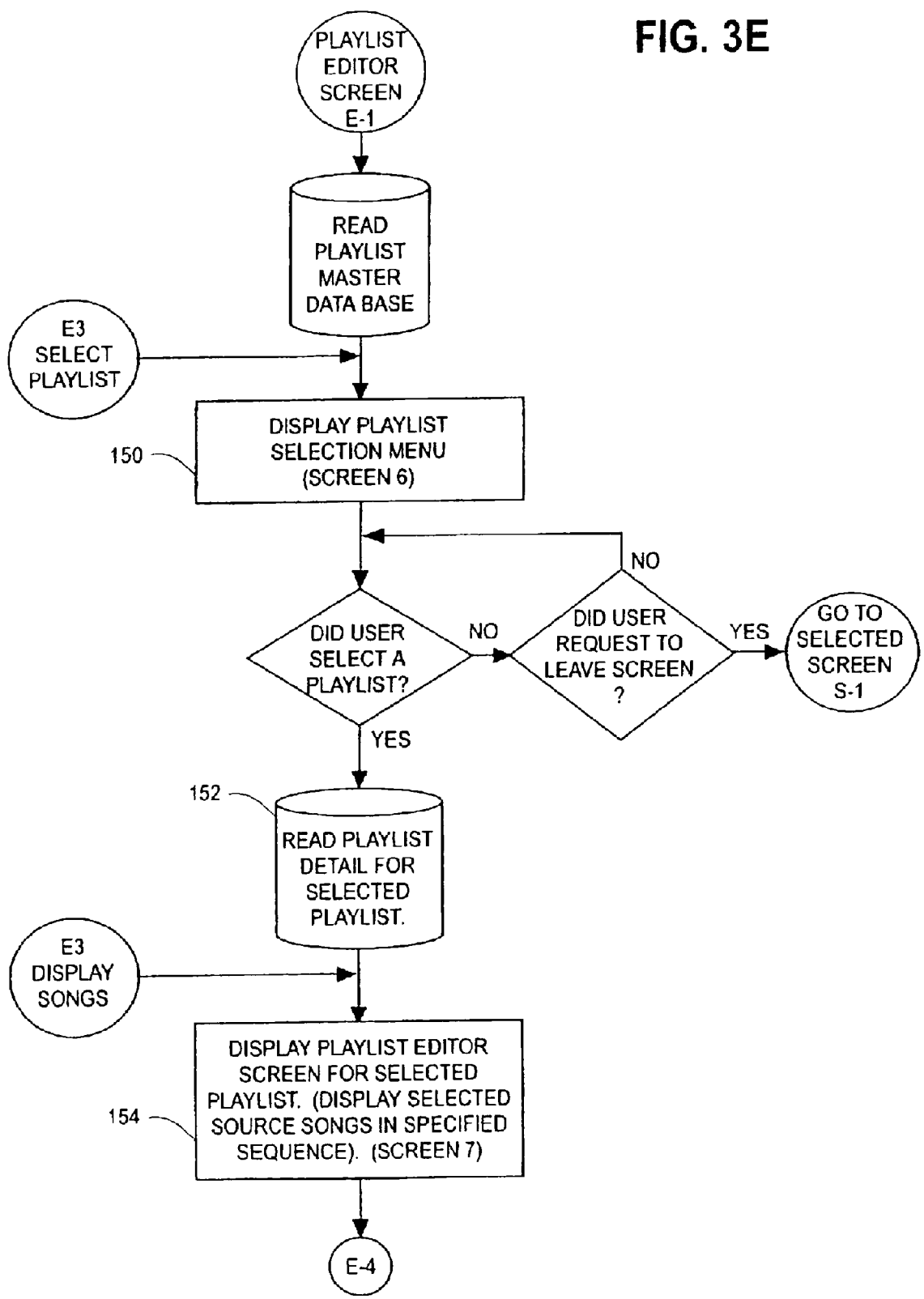
Figure 3F:
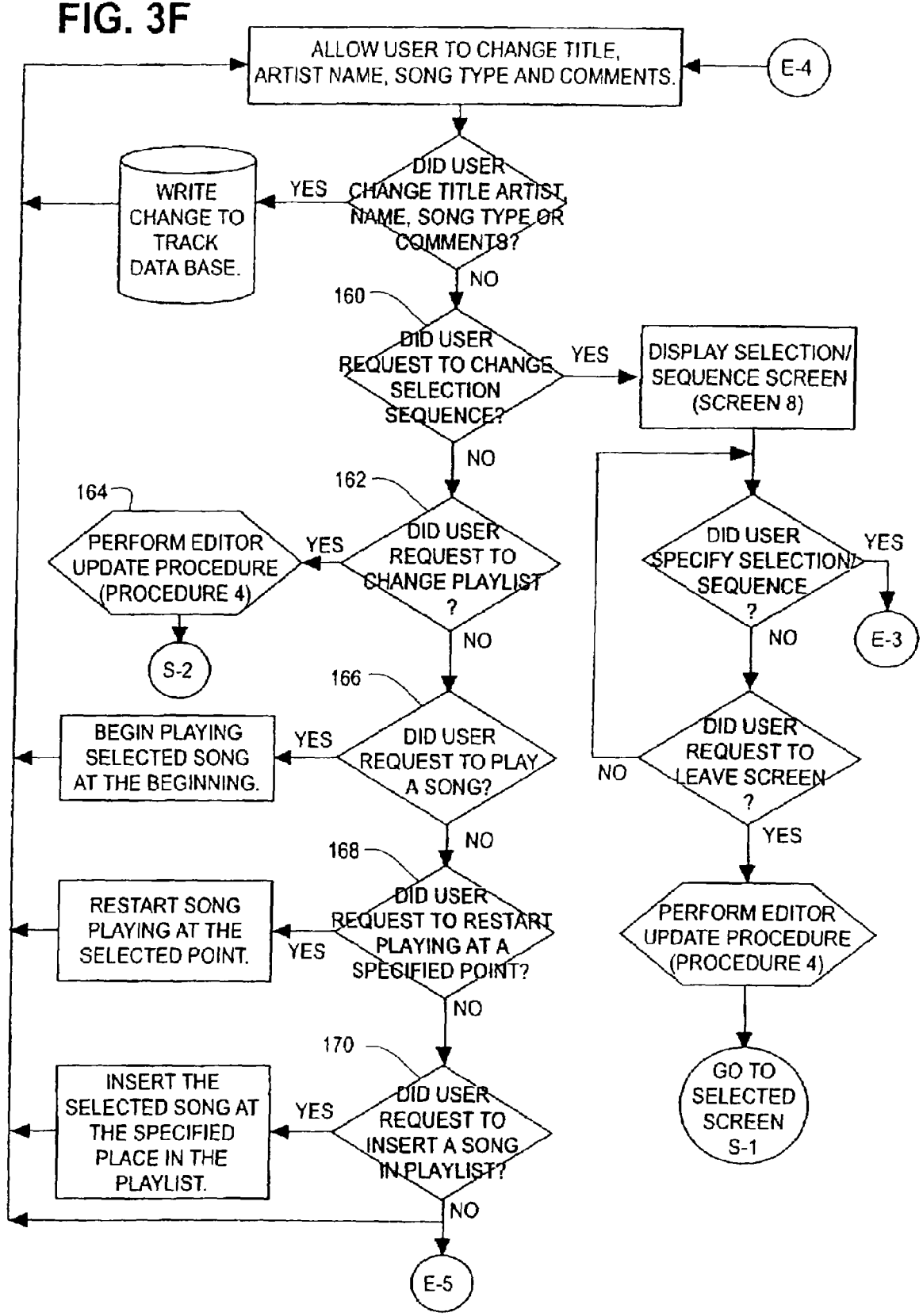
Figure 3G:
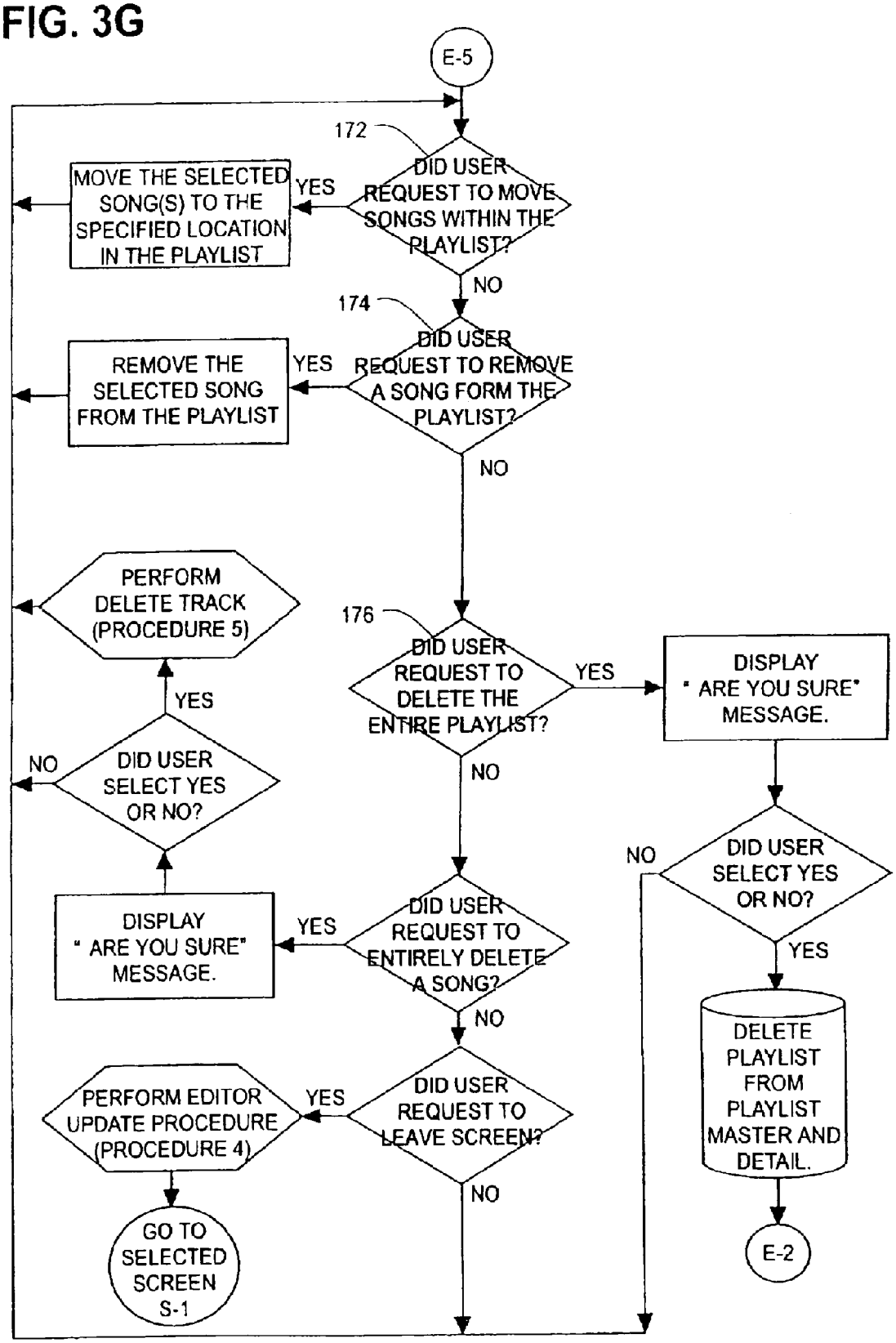
Figure 3H:
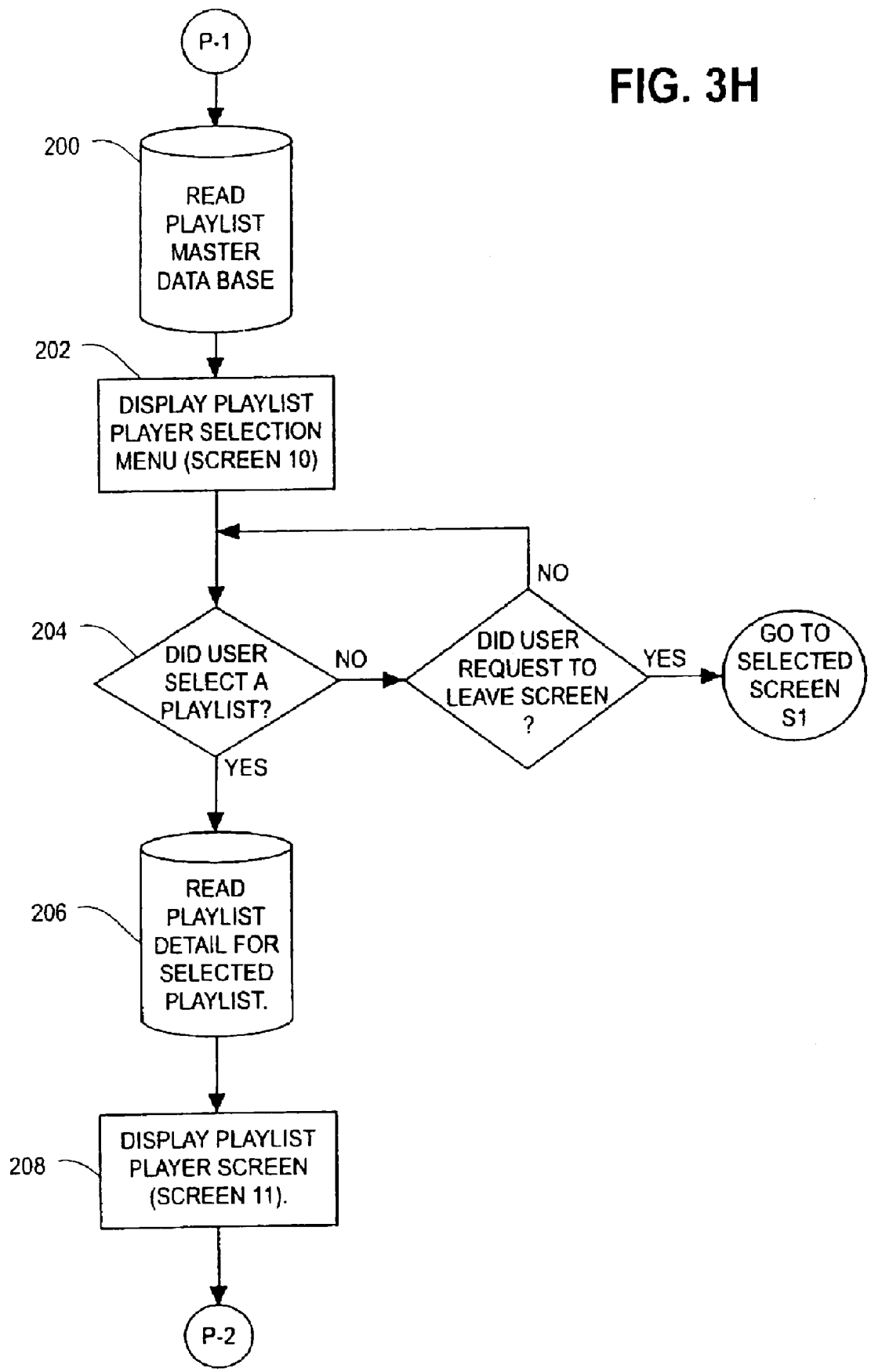
Figure 3I:
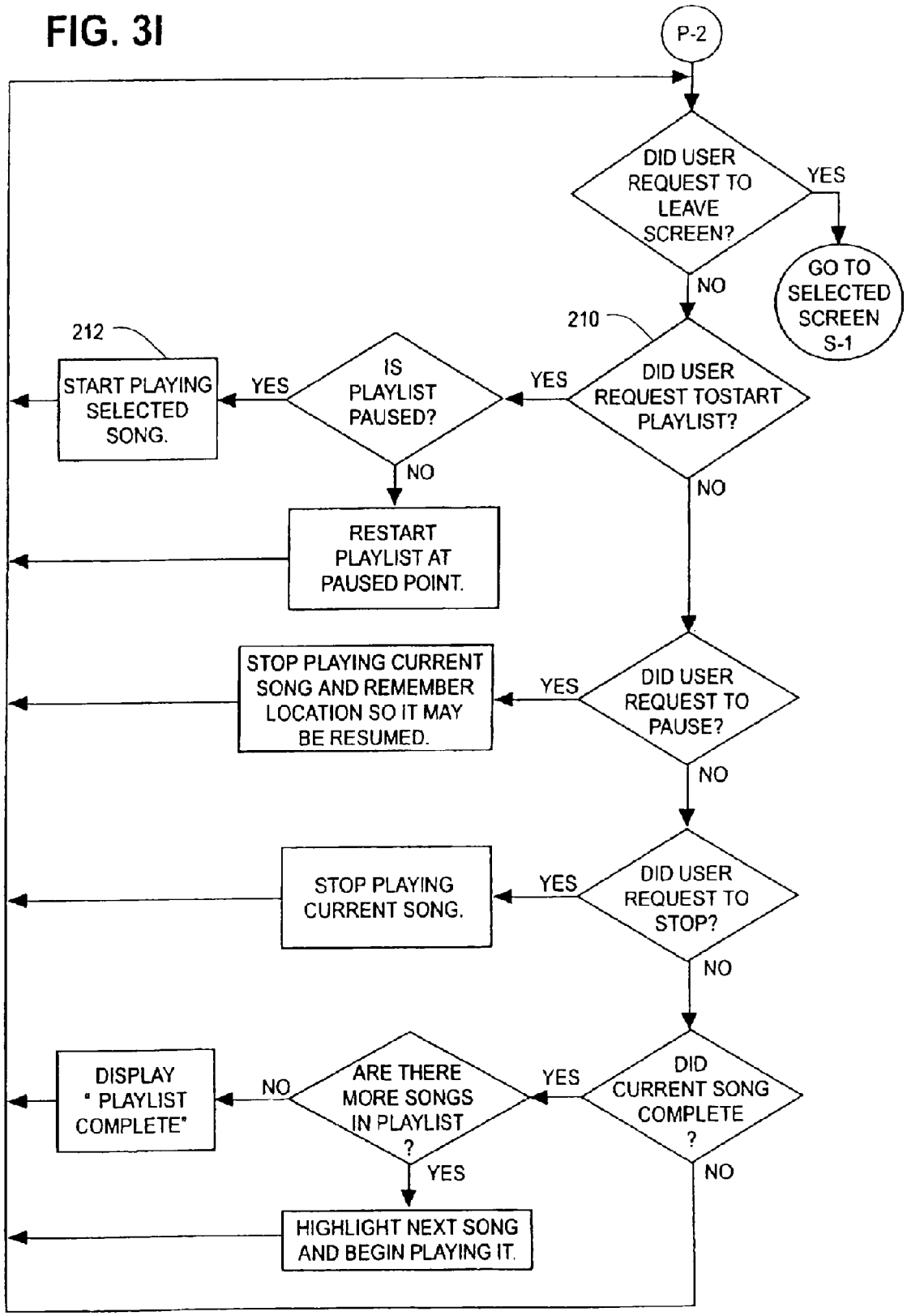

FIG. 3A illustrates the initial steps in reading a source of digitized works, such as a CD and in selecting either the record sequence, FIGS. 3B, 3C, and 3D, the list player sequence FIGS. 3H and 3I, or the playlist editor sequence FIGS. 3E, 3F and 3G. In step 100 a determination is made if a CD is present in the drive 12c. If so, the program 16 initiates record steps illustrated in FIGS. 3B, 3C and 3D. If not, the playlist master database is checked in a step 101. If playlists had previously been created, the playlist screen sequence is executed, FIGS. 3H and 3I in step 102. Alternately the editor sequence can be entered, FIGS. 3E, 3F and 3G in step 103.

Figure 4A:
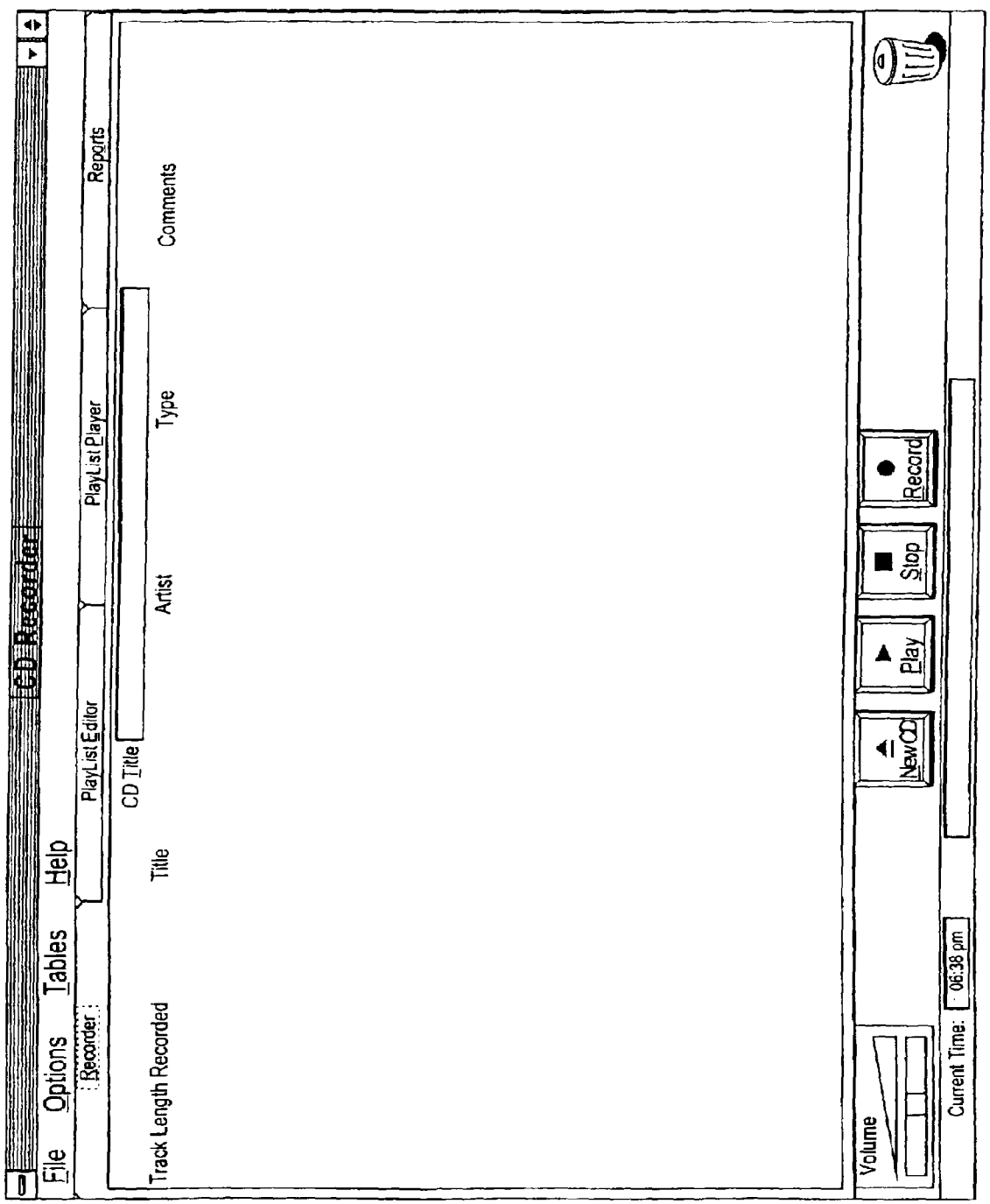
Figure 4B:
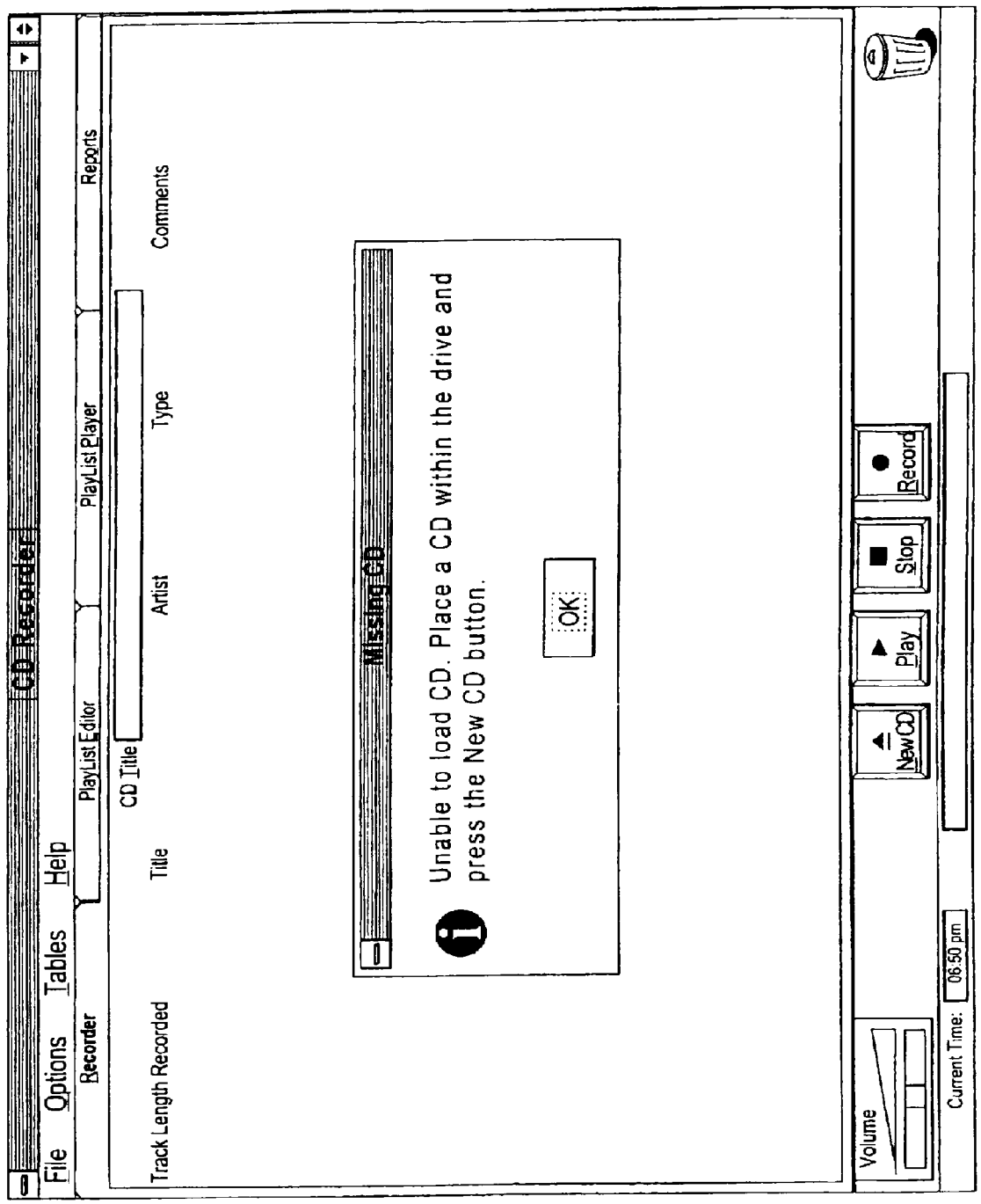

With respect to the record sequence FIG. 3B, during the process of recording information off of the respective CD, in a step 110 an initial screen, FIG. 4A is displayed. If the processor 12a determines in a step 112 that a CD is not present, then a CD missing display, FIG. 4B is presented in a step 113.

Figure 4C:
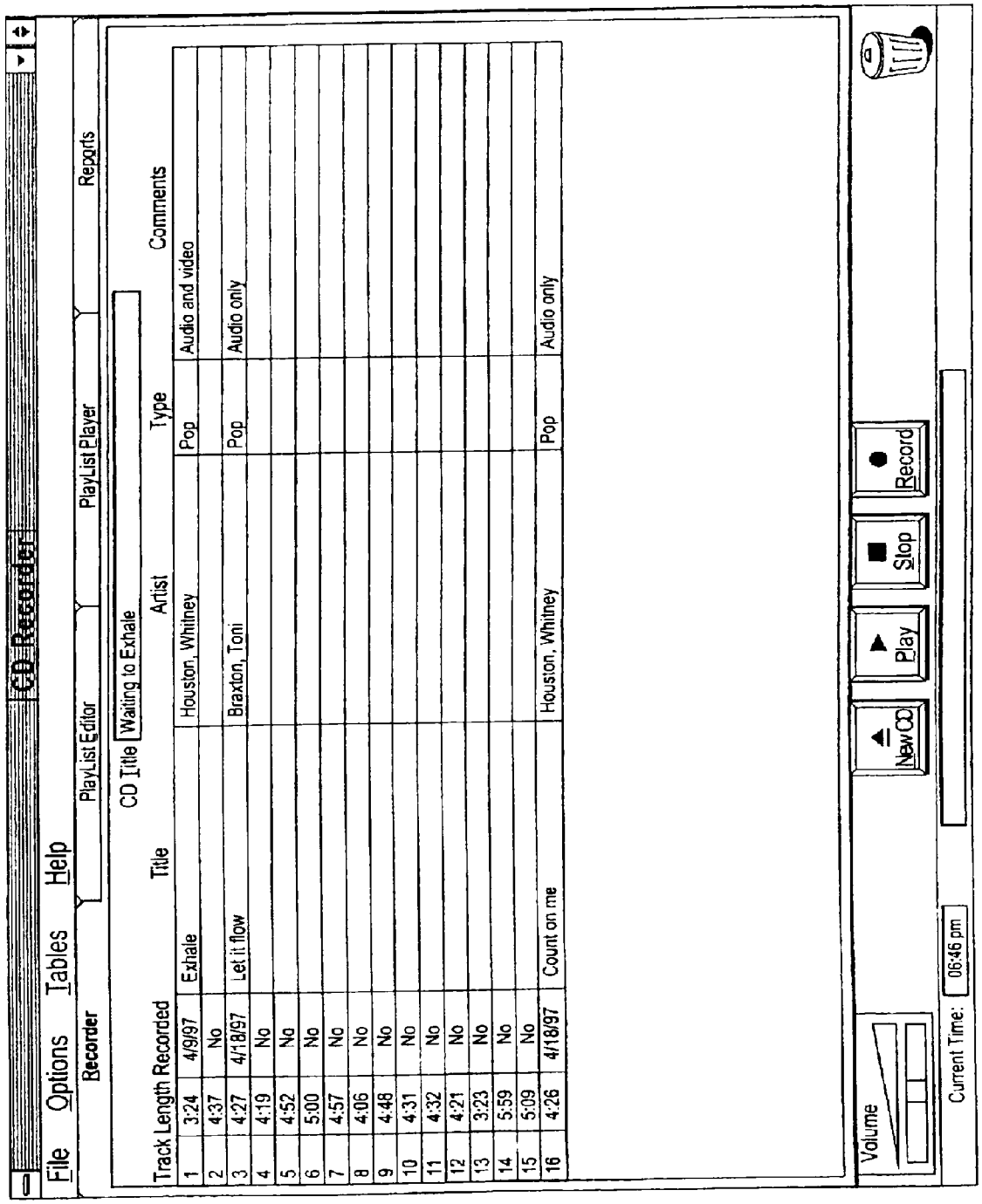
Figure 4D:
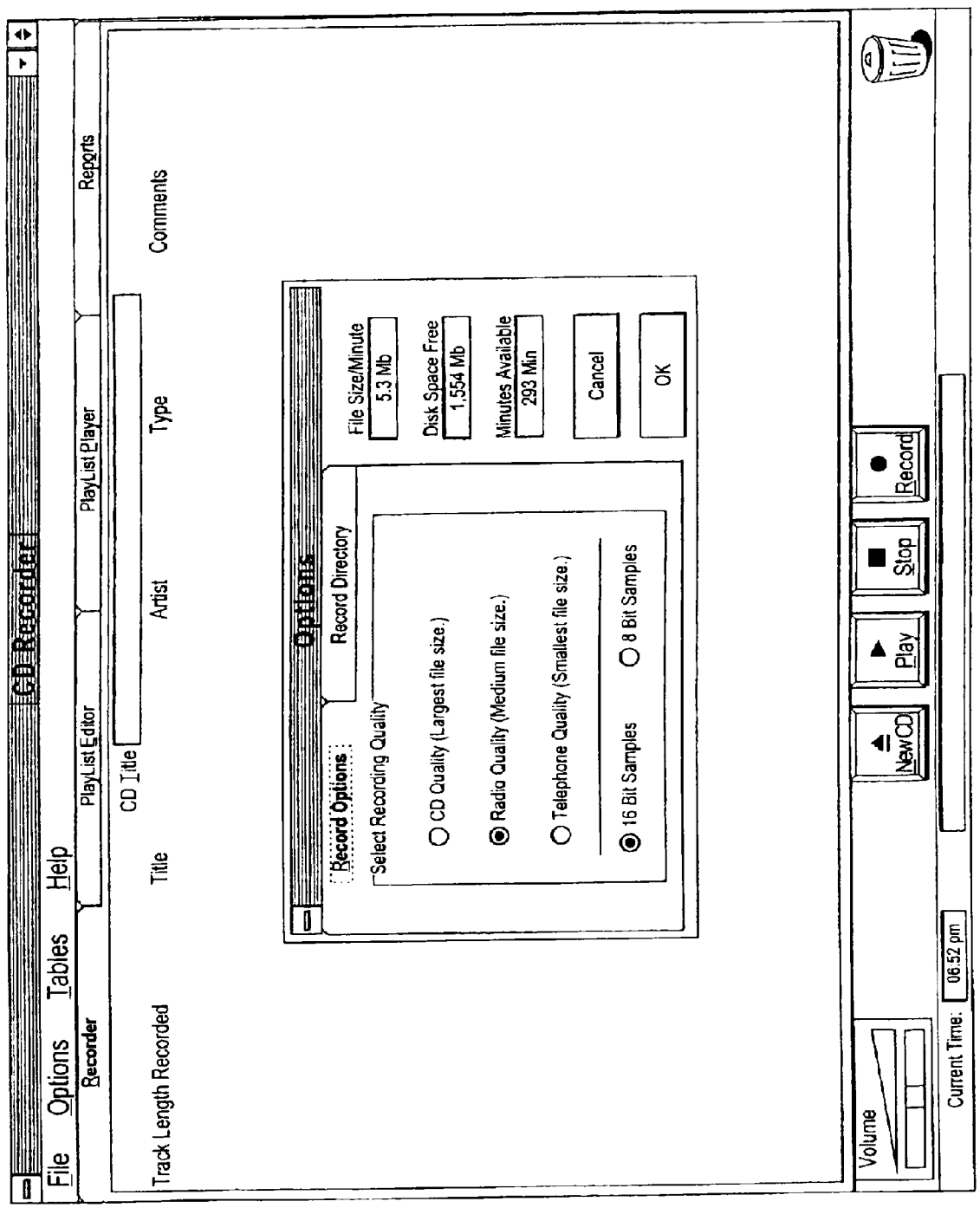
Figure 4E:
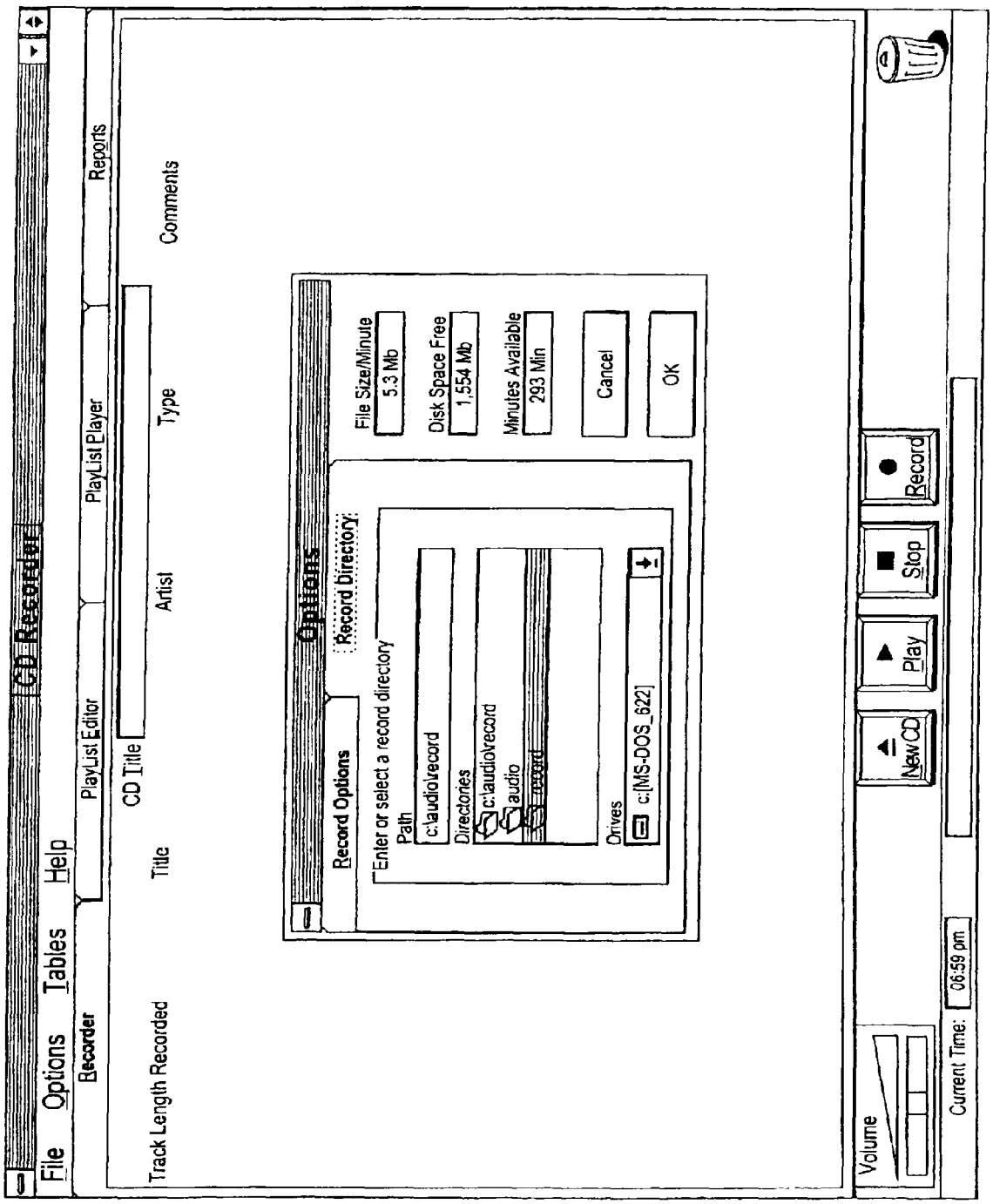
Figure 4F:
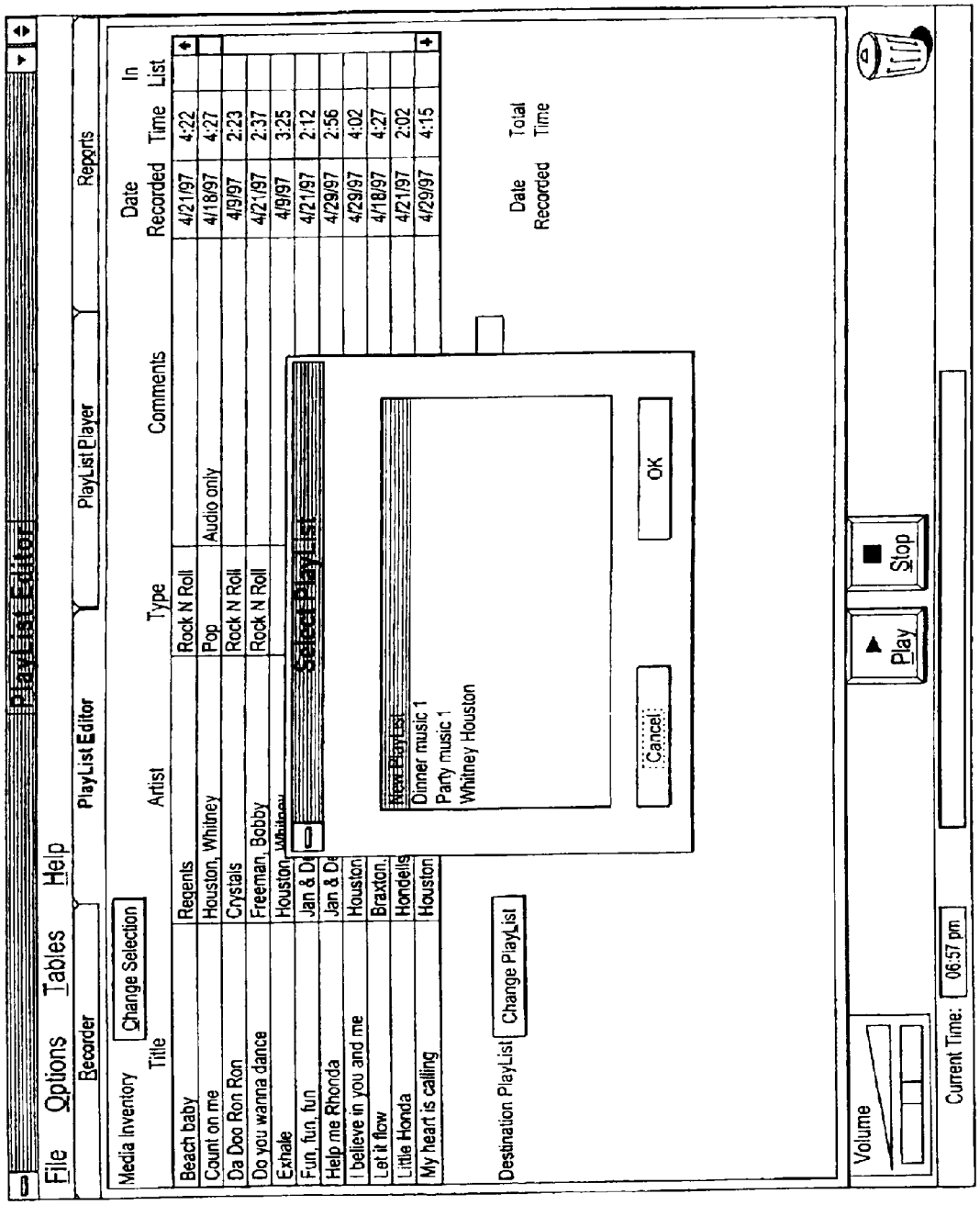

In the event that a CD is present, in a step 114, information will be read off of it as to track numbers and play times and displayed in a step 116 as in FIG. 4C. In a step 118, the master CD database is checked and if a corresponding record is found, in a step 120 the name of the CD is displayed, as indicated in FIG. 4C. Where tracks off of the respective CD had been previously recorded, in step 122, that information will be retrieved from the track database and displayed also as illustrated in FIG. 4C. The length of each track, recording date, title artist and type of work all can be displayed.

With respect to FIGS. 3C and 3D, in a step 124 the control program 16 determines whether or not the user has selected a track to play. If so, the selected track is played in a step 126. If desired, as illustrated in a step 126a characteristics of the work such as beats per minute can be computed and displayed for the user.

In a step 128, the control program 16 checks to determine whether or not the user requested restart of a work at a specified point. If not the system determines in a step 130 if the user has selected one or more tracks to be recorded. If so, in a step 132, selected tracks are recorded.

The system control program 16 also determines whether or not the user has requested a deletion in a step 134 or requested that a new CD be loaded in a step 136, select options in a step 138, a tables function in a step 140 or an exit function in a step 142. In each of steps 136, 138, 140 and 142, the requested respective procedure is carried out.

Where a user has selected the edit screen, illustrated in FIGS. 3E, 3F and 3G, one or more pre-existing playlists can be retrieved and edited. In a step 150, a playlist selection menu is displayable by the control program 16, in accordance with FIG. 4F. Using the selection menu a particular playlist can be selected and the detail retrieved in a step 152 for the selected playlist. The selected playlist can be displayed for editing as illustrated in FIG. 4G in a step 154. For the convenience of the user, the editor screen, FIG. 4G, illustrates in an upper section, an inventory list of available works currently in inventory which can be selected and entered into the destination playlist, in the lower portion of the display illustrated on FIG. 4G.

Figure 4H:
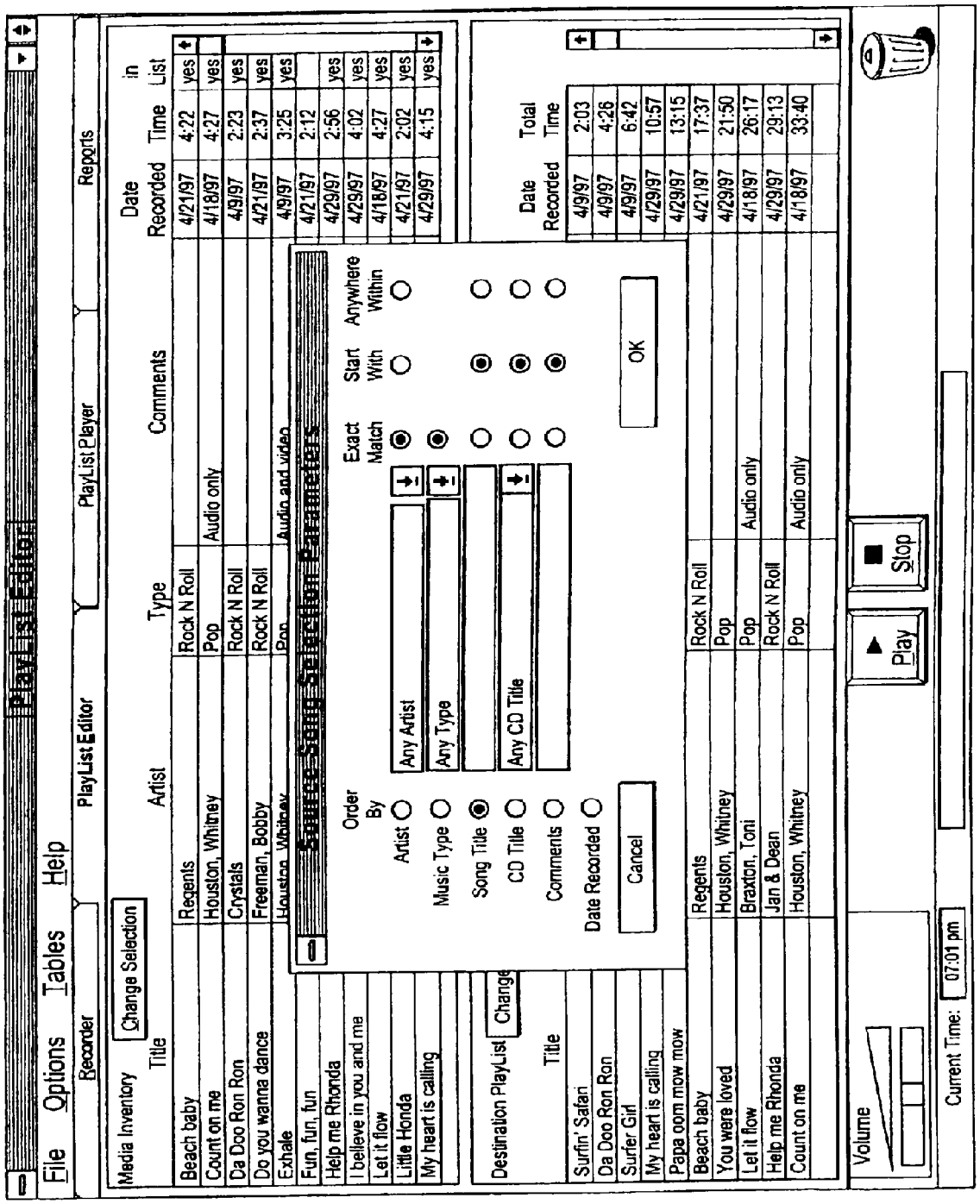

As illustrated in FIG. 3F, in a step 160, a user can edit or revise selections or the sequence of selections in the subject list using an editor selection screen as illustrated in FIG. 4H. In the event that the user requested a change in the play sequence in a step 162, an update procedure is executed in a step 164 corresponding to FIG. 3D and FIG. 4I. It will be understood that standard editing-type functions will be available to the user as would be known to those of skill in the art.

In a step 166 the user can request that a particular selected work be played or presented. The works can be restarted in a step 168 at a particular point.

The user can insert a work or a song in playlist in a step 170. With respect to FIG. 3G, a work or song can be moved within the playlist in a step 172. A particular song or work can be removed from the selected playlist in a step 174. The entire playlist can be deleted in a step 176.

Figure 4J:
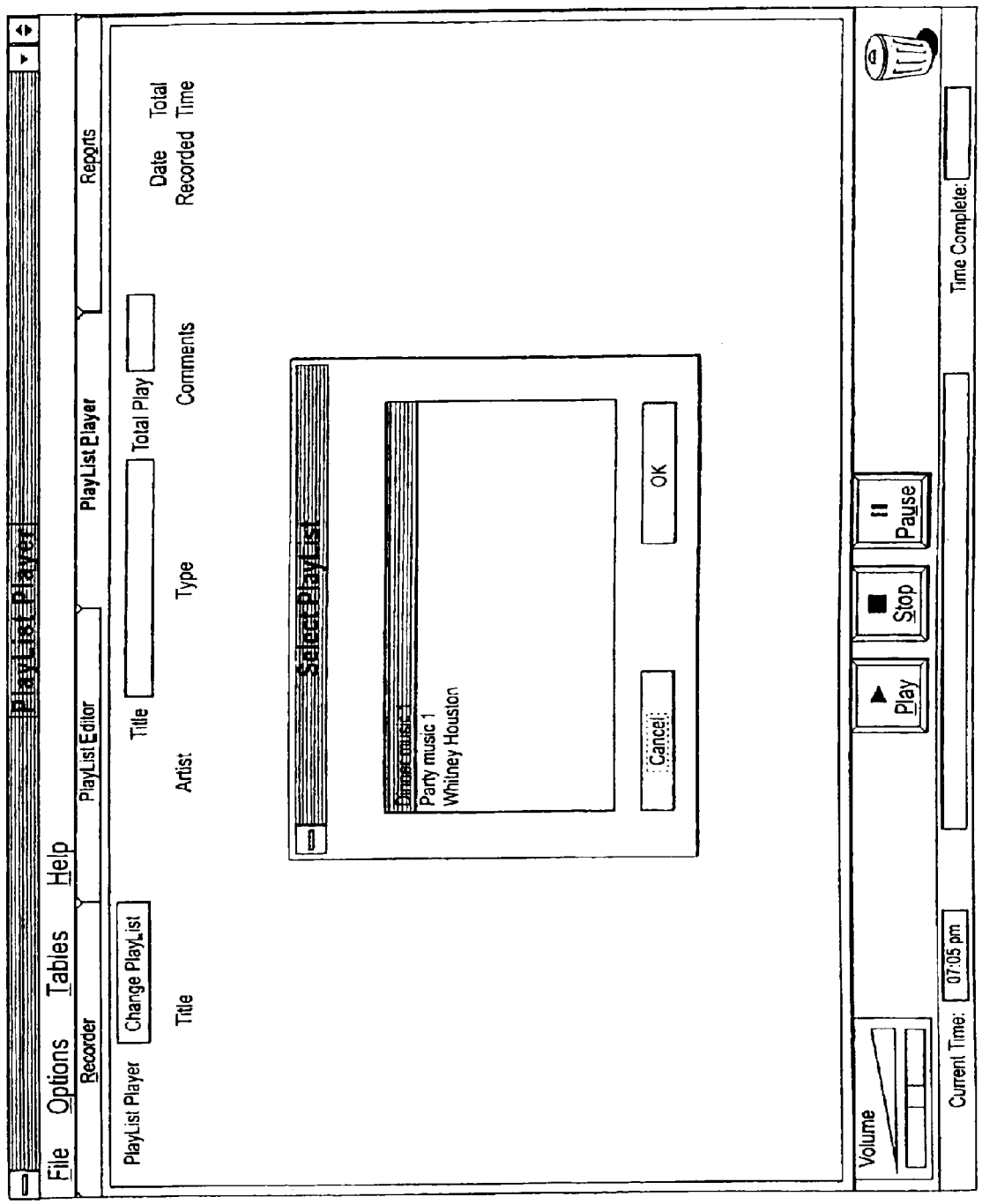

In the event that the user desires to select a particular playlist for execution, in a step 102, FIG. 3A, the playlist master database is read in a step 200, FIG. 3H. The playlist player selection menu FIG. 4J is displayed in a step 202. If the user selects a playlist in a step 204, the playlist detail is read from the appropriate database in a step 206. The selected playlist is then displayed, FIG. 4K, in a step 208.

With respect to FIG. 3I, the user can exit the player screen sequence or can request execution of the playlist in a step 210 at the beginning of the list or at a specified work or song. The list is then executed in a step 212.

Figure 3J:
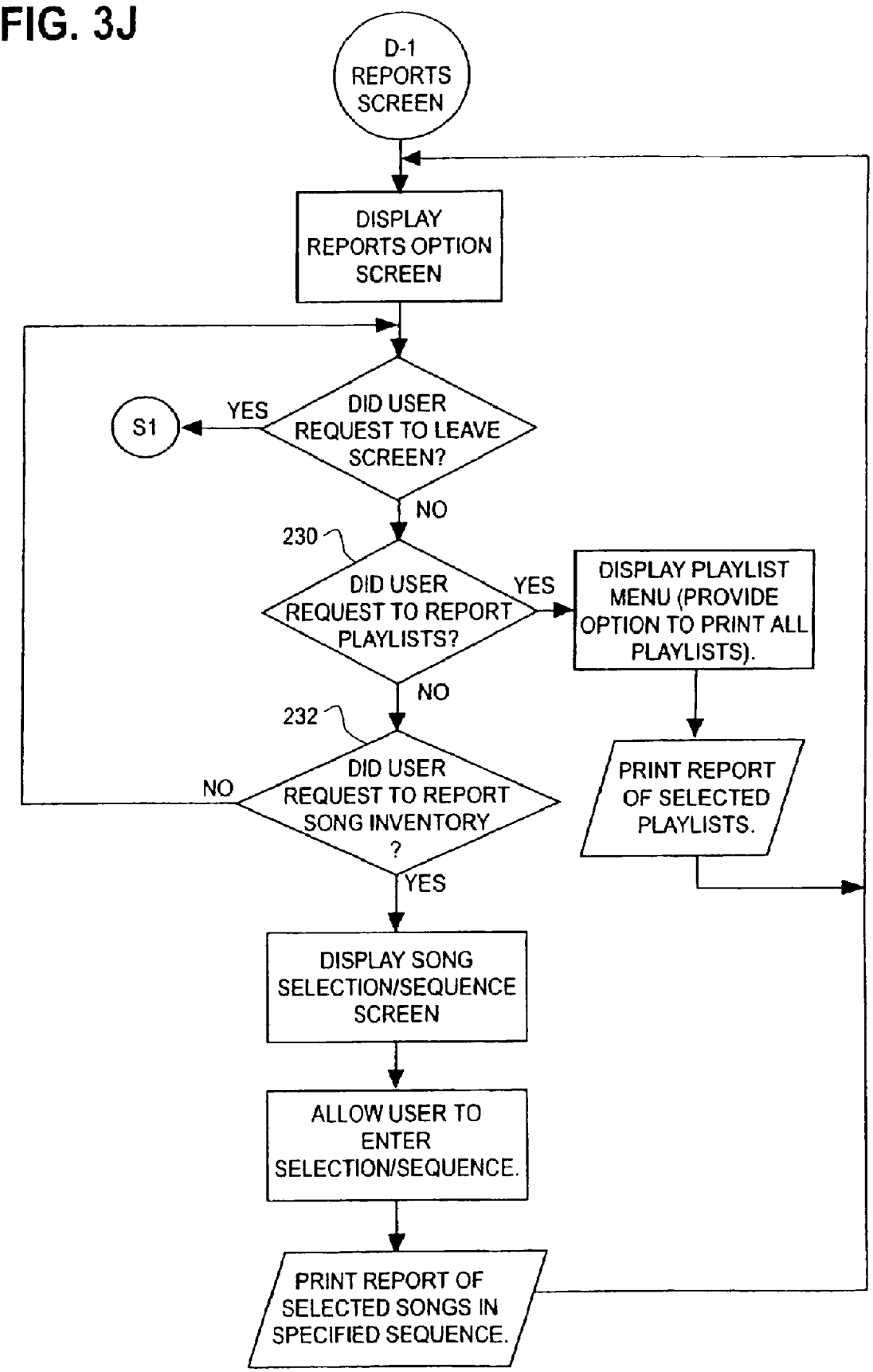

In the event that one or more reports are to be created using the printer 12g, the process of FIG. 3J can be used to request reports as to existing playlists in a step 230. Alternately, the user can request a report of the existing inventory of media elements in a step 232.

Figure 3K:
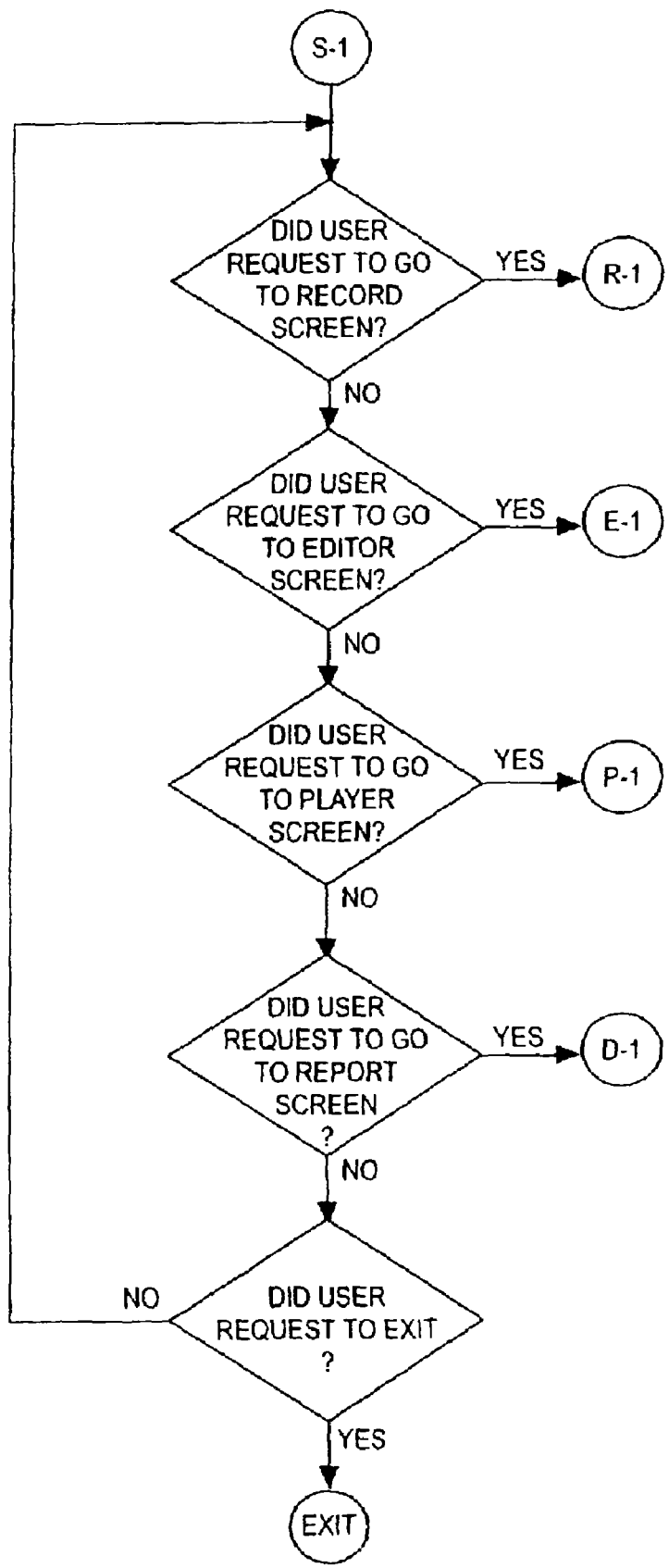
Figure 3L:
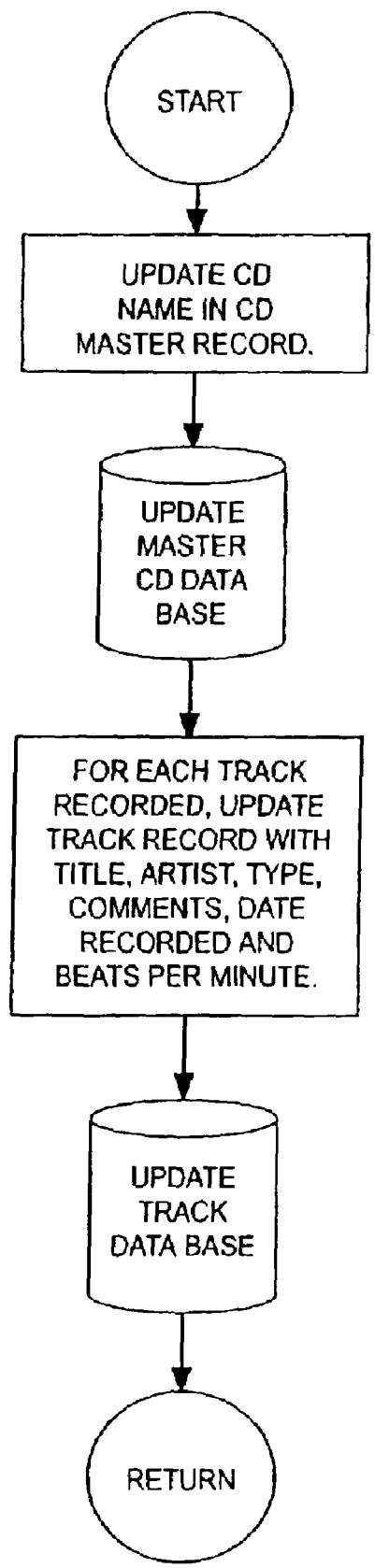

Screen selection is carried out in accordance with the process illustrated in FIG. 3K. Updating of data from the record screen is carried out in a process illustrated in FIG. 3L.

Figure 3M:
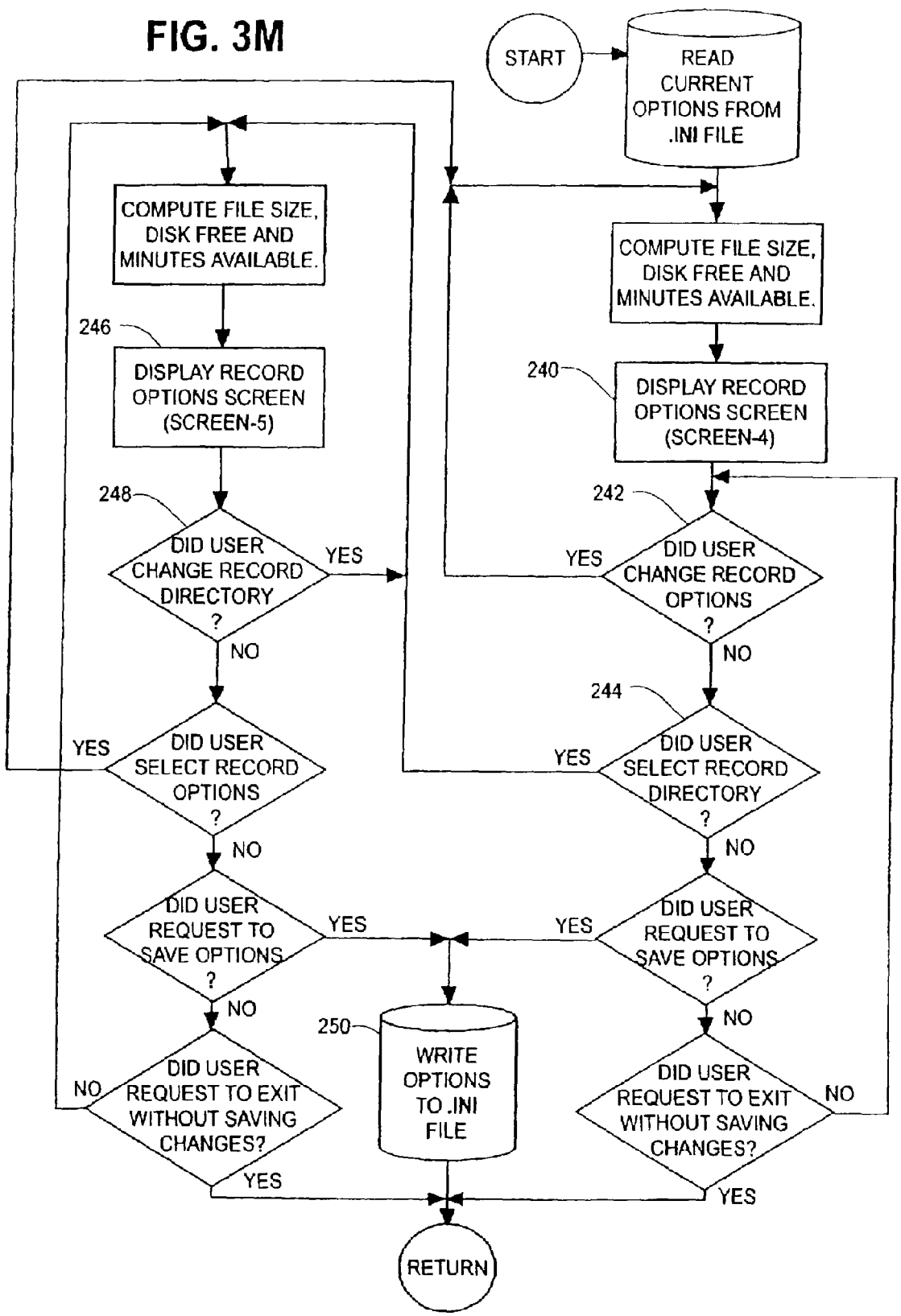

FIG. 3M illustrates steps associated with carrying out requests for various optional functions. For example, in a step 240 an option screen, FIG. 4D, can be displayed for a user.

The user can subsequently in a step 242 change the record options. In the event that the user in a step 244 selects a record directory, the record directory screen FIG. 4E can be displayed in a step 246. The displayed screen can be altered by the user in a step 248. The revised record options can be stored in a step 250 for subsequent use.

Figure 3N:
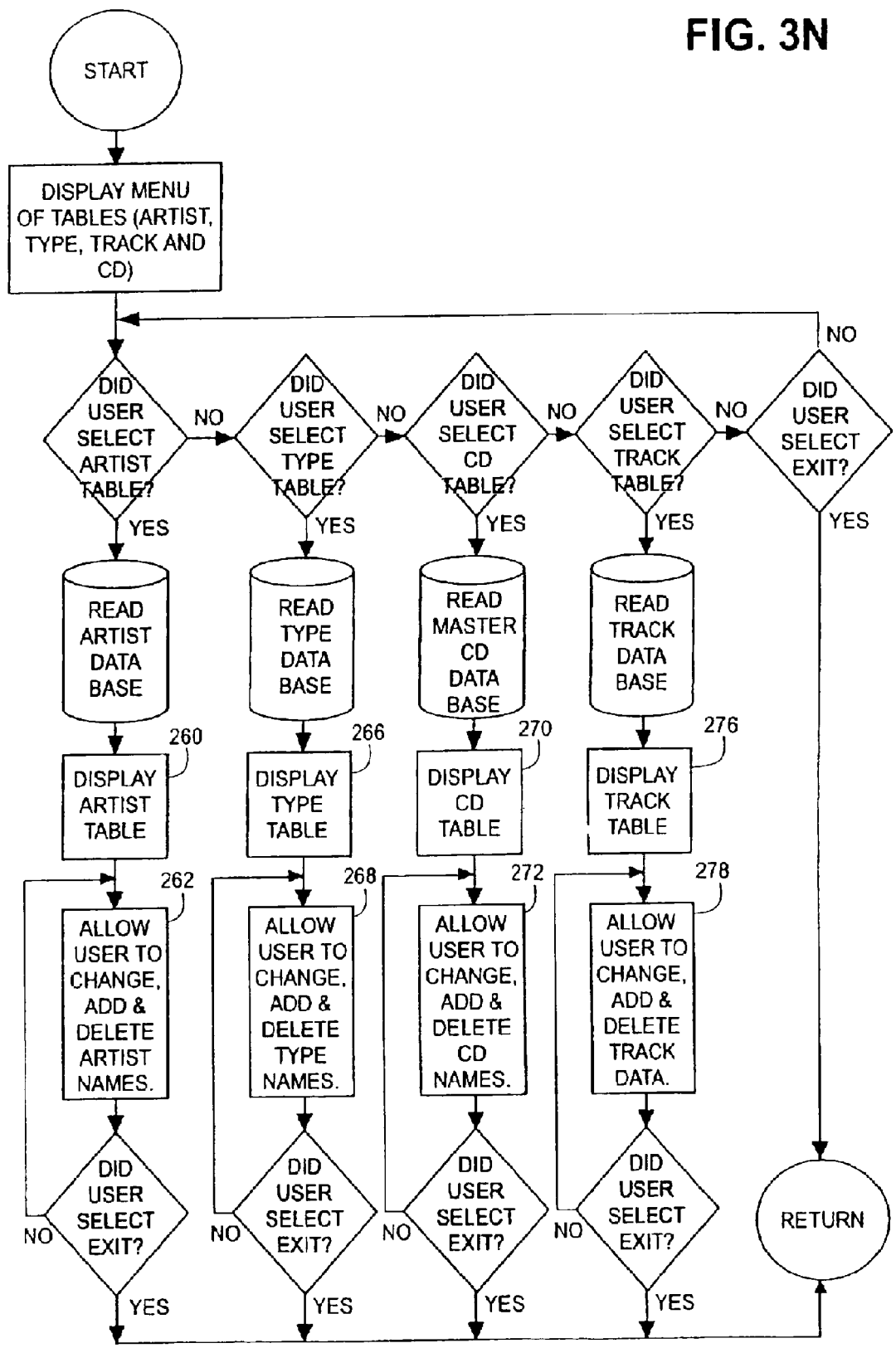
Figure 30:
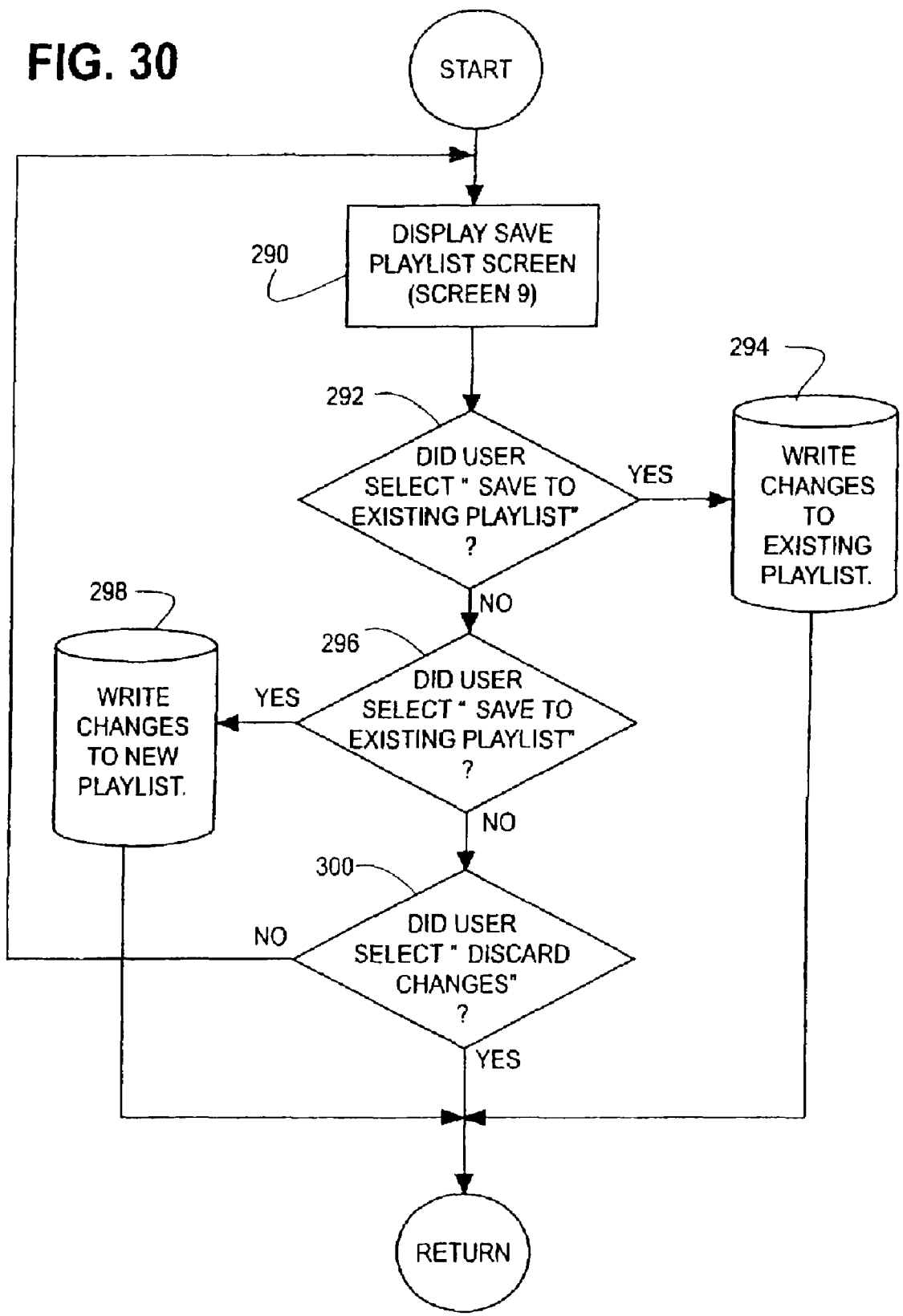

FIG. 3N illustrates steps of a process wherein the user is able to select and display various tables. In a step 260 an artist table can be displayed and edited in a step 262. In a step 266 the type table can be displayed and edited in a step 268. In a step 270, the CD table can be displayed and edited in a step 272. The track table can be displayed in a step 276 and edited in a step 278.

FIG. 3O illustrates the steps in a process of saving the playlist screen, FIG. 4I. In a step 290 the playlist save screen is displayed. In a step 292, if the user has selected to save the existing playlist, the changes are written to the respective database in a step 294. If the user elected to save the new playlist in a step 296, the changes are written to the new playlist database in a step 298. Finally, the user can discard the changes and exit in a step 300.

Figure 3P:

FIG. 3P illustrates the steps of a procedure for deleting a selected work or track.

Hence, as described above, the system 10' can be used to create new or modified playlists, and execute same thereby presenting the sequence of works to a user. Alternately, pre-existing playlists can be edited and additional new playlists created which then subsequently be executed.

Those of skill in the art will understand that other functions as illustrated in FIGS. 3A-3P will also be provided by the control program 16. Attached hereto is a preferred data structure for use with the flow diagrams of FIGS. 3A-3P.

Figure 6:
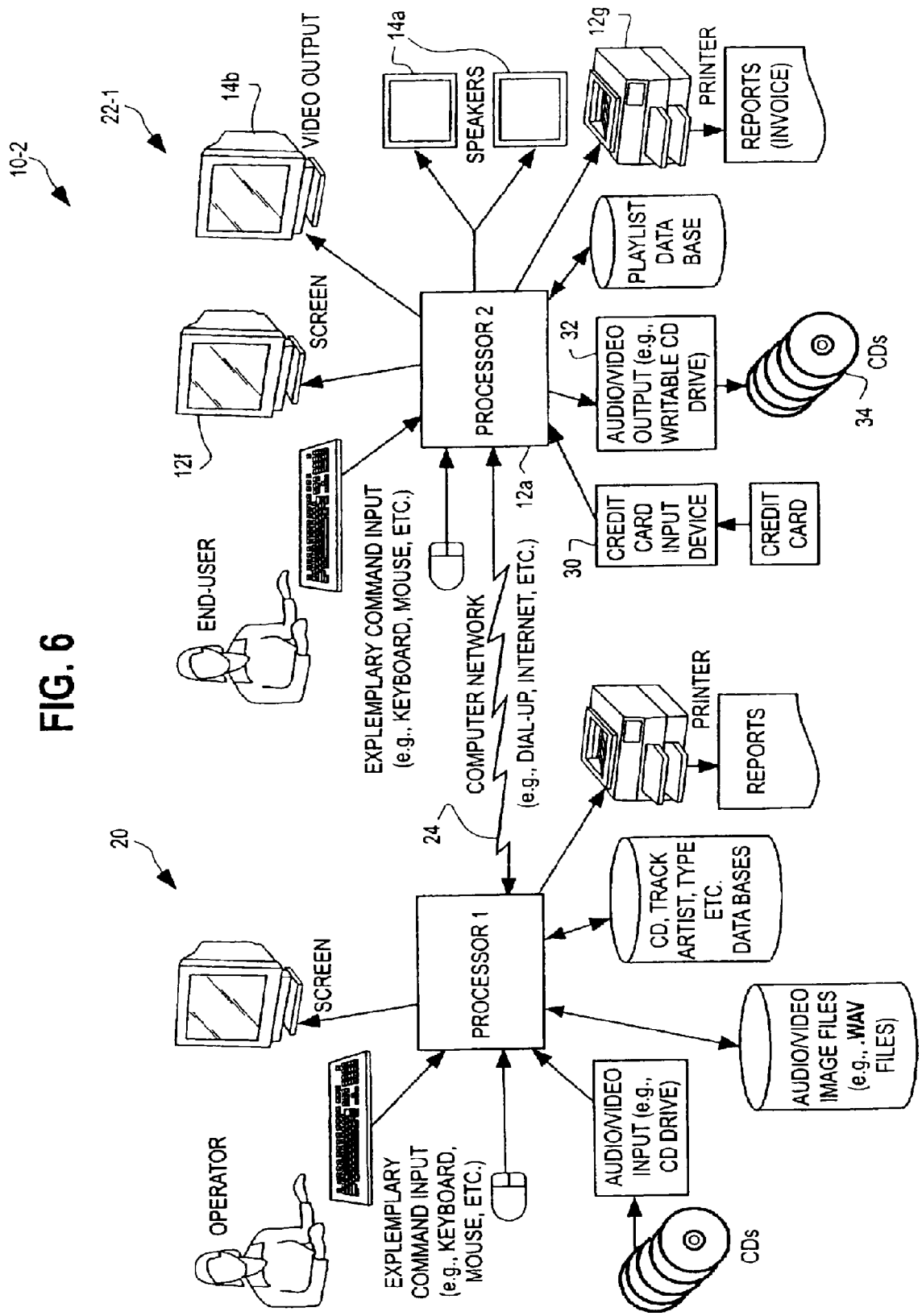
FIG. 6 is a diagram of a system intended to provide a custom written medium of works obtained from a remote source and in response to establishing a predetermined credit.
Figure 7:
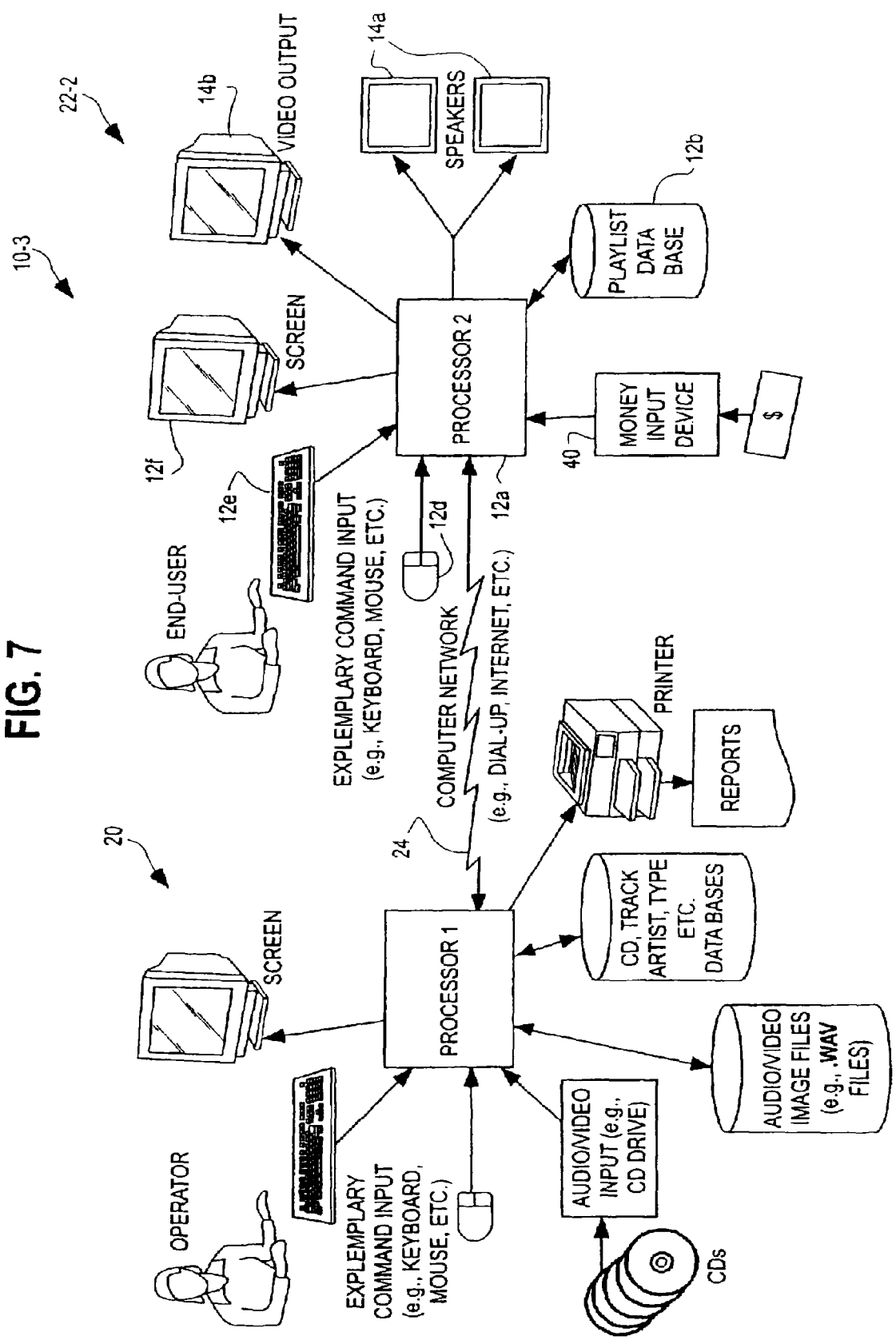
FIG. 7 is a diagram illustrating a system for presenting works on demand from either a local or a remote source.

FIGS. 5 through 7 illustrate alternate types of list building systems. FIG. 5 illustrates a system 10-1 which is a network based playlist creating and executing system. The system 10-1 incorporates a remote source 20 of works which are to be assembled and played or presented at a user's unit or terminal 22. The unit 20 is intended to be an element or a location accessible via a network. For example, the unit 20 can be a location on an internet or the internet or any other network. It can be accessed via a land line or wireless communication link 24 without limitation.

The system 20 incorporates a processor 20a, and databases 20b. The databases 20b include stored digital representations of a variety of works which can be obtained off of local drives, such as the drive 20c without limitation. The remote system operator has available standard input control devices such as mouse 20d, keyboard 20e or other desired input devices. A display screen 20f of the conventional variety is also provided. The remote system 20 also includes an optional printer 20g for purposes of creating hard copy reports for invoicing, billing or royalty payment purposes without limitation.

The system 20 provides a remote pre-stored inventory which the unit 22 can access via communication link 24. The unit 20 provides supervisory and billing services in response to requests by the end user's unit 22 for access to one or more of the works stored in the inventory in the databases 20b.

Subsequent to the request being authorized, the selected works can be made available to the terminal 22 via the communication link 24. The unit 22 can in turn be used as described previously to create new playlists, edit existing lists and then execute the lists under the control of the local end user. The terminal 22 is especially convenient for the end user in that the works can all be acquired electronically and there is absolutely no need for acquiring and keeping a plurality of CDs.

If desired, processor 12a in system 10-1 can keep track of the number of plays and total play time and transmit that information to processor 20a, for billing purposes. Reports producible by the processor 20a include total plays and play time along with invoices for end users. Documentation for royalty payments to the appropriate recipients can also be created. Finally, the reports can list those works by demand or popularity by day, week or month.

FIG. 6 illustrates a system 10-2 which includes a remote source, such as the remote source 20 and a local terminal 22-1. Terminal 22-1 includes elements similar to the terminal 22 previously discussed. Corresponding elements are identified with the same identification numeral.

The terminal 22-1 additionally includes a credit establishing input such as a credit card reader 30. The reader 30 can be used by a user to make a credit card account number available to the terminal 22-1 for billing purposes.

Once a credit line has been established, the user will be able to use the terminal 22-1 to create and/or modify one or more playlists into write the selected media elements via an output drive 32 to a removable medium 34 which could be a CD or a DVD.

The terminal 10-2 could be located in a business establishment and users interested in obtaining a custom combination of works can access the services of the terminal 22-1 via the reader 30 for purposes of creating and writing the desired sequence of works on the medium 34. Other services made available by the terminal 22 can also be made available by the terminal 22-1 in response to the established credit line.

Additional services that can be made available by the terminal 22-1 include printing invoices via the printer 12g. Report information can be transmitted to the system 20 for billing purposes with respect to the commercial establishment where the terminal 22-1 is located as well as making royalty payments to appropriate recipients.

FIG. 7 illustrates an alternate system 10-3 which can be used for entertainment purposes in public establishments. The system 10-3 provides jukebox-like services at the terminal 22-2. These are under the supervision and control of remote system 20.

The terminal 22-2 includes a credit establishing device which could be a coin or a bill receiving unit 40 of a type used with vending machines. Alternately, the unit 40 could also accept credit cards if desired.

Upon establishing an appropriate credit via the unit 40, the terminal 22-2 enables a user to select one or more works whose titles might be displayed on the control screen 12f via the input devices 12d, 12e.

The selected works could be resident at the local database 12b or could be acquired from the remote unit 20 via the communication link as discussed previously. The system 22-2, unlike conventional jukeboxes, has an unlimited selection of audio or audio/video works available to it via communication link 24. In addition, for security purposes, the terminal 22-2 does not include an inventory of valuable CD or DVD media. The works could include audio works, such as music, audio/visual works such as advertisements, music videos or others.

The terminal 22-2 presents a rolling playlist on the screen 12f which can be reviewed by the end user or individual selecting the works to be presented. Newly selected or identified works are added at the end of the playlist and are presented via speakers 12a and video output 12b in sequence depending on the nature of the work. Hence, the terminal 22-2 makes possible the presentation of arbitrarily selected works, in an arbitrary order in response to the credit established by the unit 40.

The remote system 20 via the link 24 monitors the works being presented and the frequency thereof. Billing information can be generated for purposes of charging the entity where the terminal 22-2 is located for each work which is presented. Reports can be produced at the system 20 identifying royalties to be paid to the appropriate recipients based on the works selected for presentation at the terminal 22-2 or for any other desired purpose. It will be understood that the appropriate file type would be used with the appropriate type of work.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

| \multicolumn{4}{c}{DATA STRUCTURE} | | | |
|---|---|---|---|

| Table | Field Name | Data Type | |
|---|---|---|---|
| Master CD | CD Number | Long Integer | Created by the track times |
|  | CD Title | Text 50 |  |
| Track | CD Number | Long Integer | Link to Master CD table |
|  | Track | Byte | Track number found on the CD |
|  | Artist Code | Integer | Link to the Artist table |
|  | Type Code | Long Integer | Link to the Type table |
|  | Track Title | Text 50 |  |
|  | Track Time | Long Integer | Actual time recorded in seconds |
|  | File Name | Text 255 | Path/File Naine of stored WAV file |
|  | Beats | Integer | Beats per minute |
| Playlist Master | Number | Counter | Database assigned key |
|  | Title | Text 50 |  |
| Playlist Detail | Number | Integer | Link to Playlist table |
|  | Play Order | Integer | Order the track was placed within the playbook |
|  | CD Number | Long Integer | Link to Track table |
|  | Track | Byte | Link to Track table |

-continued

DATA STRUCTURE

| Table | Field Name | Data Type | |
|---|---|---|---|
| Artist | Artist Code | Counter | Database assigned Artist index |
| | Artist Name | Text 255 | |
| Type | Type Code | Counter | Program assigned index to Music Type |
| | Music Type | Text 50 | |

What is claimed:

1. A system for presenting advertisements to a user, said system comprising:
a digital storage medium for storing an inventory of digital audio and/or video works,
a digital processor operatively associated with said digital storage medium for building a playlist comprising a plurality of said digital works, said playlist built in response to selections by a user; and
a communication link operatively associated with said digital processor and in communication with a remote server, wherein said digital processor downloads an advertisement from the remote server and wherein the digital processor presents the advertisement to a user before one of the digital works on the playlist is presented to the user,
wherein the digital storage medium further stores a plurality of information records, each information record being associated with a particular one of said digital works included in said inventory and further comprising at least one data field having an entry which corresponds to a characteristic of the associated work; wherein the remote server further stores a plurality of digital audio and/or video works together with a second plurality of information records, each information record being associated with a particular one of said digital works stored on said remote server; and wherein said communication link downloads at least one of said digital works stored on said remote server to said digital storage medium, and wherein, without interaction from a user, said digital processor (1) accesses said second plurality of information records via said communication link, and from said second plurality of information records identifies an information record associated with said downloaded work, (2) creates at least one information record corresponding to said downloaded digital work and populates at least one data field of said created information record with an entry based on one or more data fields of said associated information record from said second plurality of information records, and (3) stores said created information record in said digital storage medium.

2. The system of claim 1 wherein the advertisement is a digital audio and/or video work.

3. The system of claim 1 wherein the digital processor further downloads at least one of the digital works from the remote server via the communication link.

4. The system of claim 1 wherein the digital storage medium device further stores a plurality of information records, each information record being associated with a particular one of said digital works and further comprising at least one data field having an entry which corresponds to a characteristic associated with the associated work; said system further including a user interface operatively associated with said digital processor for receiving a user entry designating a characteristic to be shared by all works in said playlist; wherein said digital processor, in response to said user entry and without further user interaction, compares said user entry with the entry contained in said data field of each said information record, and wherein, if the user entry matches the entry contained in said data field, said digital processor, without further user interaction, includes the work corresponding to that information record in said playlist.

5. The system of claim 1 wherein the digital storage medium further stores a plurality of information records, each information record being associated with a particular one of said digital works and including a play count indicative of the total number of times the associated work has been played; wherein said digital processor, without user interaction, analyzes the play count data stored in the information records and, from that data, builds the playlist in accordance with the desired play count characteristic.

6. The system of claim 1 wherein the digital storage medium further stores a plurality of information records, each information record being associated with a particular one of said digital works and further comprising data indicative of the date and time that the associated work was last played; wherein said digital processor, without user interaction, builds a playlist of works associated with the information records having data indicative of the most recent date and time of playback.

7. The system of claim 1 wherein the playlist contains a fixed number of digital audio and/or video works, wherein said digital processor plays one of the digital audio and/or video works contained in said inventory and, without user interaction, includes said played work in said playlist.

* * * * *